US012754289B2

(12) United States Patent
Takahashi et al.

(10) Patent No.: US 12,754,289 B2
(45) Date of Patent: Oct. 6, 2026

(54) INFORMATION PROCESSING APPARATUS, INFORMATION PROCESSING METHOD, AND SENSING SYSTEM

(71) Applicant: Sony Semiconductor Solutions Corporation, Kanagawa (JP)

(72) Inventors: Kousuke Takahashi, Kanagawa (JP); Kazutoshi Kitano, Kanagawa (JP); Yuusuke Kawamura, Kanagawa (JP); Takeshi Kubota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 575 days.

(21) Appl. No.: 18/264,862

(22) PCT Filed: Dec. 23, 2021

(86) PCT No.: PCT/JP2021/047830
§ 371 (c)(1),
(2) Date: Aug. 9, 2023

(87) PCT Pub. No.: WO2022/196016
PCT Pub. Date: Sep. 22, 2022

(65) Prior Publication Data

US 2024/0103133 A1 Mar. 28, 2024

Related U.S. Application Data

(60) Provisional application No. 63/162,234, filed on Mar. 17, 2021.

(51) Int. Cl.
*G01S 7/48* (2006.01)
*G01S 17/42* (2006.01)
(Continued)

(52) U.S. Cl.
CPC ............ *G01S 7/4802* (2013.01); *G01S 17/42* (2013.01); *G01S 17/58* (2013.01); *G06F 3/011* (2013.01)

(58) Field of Classification Search
CPC ........ G01S 7/4802; G01S 17/42; G01S 17/58; G01S 17/34; G01S 17/36; G01S 17/89; G06F 3/011; G06F 3/017; G06F 3/01
See application file for complete search history.

(56) References Cited

U.S. PATENT DOCUMENTS

2014/0300886 A1 10/2014 Zogg
2018/0108146 A1* 4/2018 Zhan .................... G06V 40/161
(Continued)

FOREIGN PATENT DOCUMENTS

JP 2010091426 A 4/2010
JP 2017041187 A 2/2017
(Continued)

OTHER PUBLICATIONS

International Search Report (PCT/ISA/210), International Application No. PCT/JP2021/047830, dated Feb. 8, 2022.

*Primary Examiner* — Michael E Teitelbaum
(74) *Attorney, Agent, or Firm* — Michael Best & Friedrich LLP

(57) ABSTRACT

An information processing apparatus according to an embodiment includes: a recognition unit (122) configured to perform recognition processing on the basis of a point cloud output from a photodetection ranging unit (11) using a frequency modulated continuous wave to determine a designated area in a real object, the photodetection ranging unit being configured to output the point cloud including velocity information and three-dimensional coordinates of the point cloud on the basis of a reception signal reflected by an object and received, and configured to output three-dimensional recognition information including information indicating the
(Continued)

determined designated area, and a correction unit (125) configured to correct three-dimensional coordinates of the designated area in the point cloud on the basis of the three-dimensional recognition information output by the recognition unit.

17 Claims, 20 Drawing Sheets

(51) Int. Cl.

| | |
|---|---|
| ***G01S 17/58*** | (2006.01) |
| ***G06F 3/01*** | (2006.01) |

(56) References Cited

U.S. PATENT DOCUMENTS

| | | | | |
|---|---|---|---|---|
| 2020/0400821 | A1 * | 12/2020 | Baker | G01S 7/4804 |
| 2021/0124350 | A1 * | 4/2021 | Kirigan | G06V 20/56 |
| 2021/0124960 | A1 * | 4/2021 | Lee | G06N 3/0464 |
| 2021/0245701 | A1 * | 8/2021 | Haltom | G06V 40/10 |
| 2021/0287037 | A1 | 9/2021 | Chen | |

FOREIGN PATENT DOCUMENTS

| | | | |
|---|---|---|---|
| JP | 2020534518 | A | 11/2020 |
| WO | 2018229812 | A1 | 12/2018 |
| WO | 2021054217 | A1 | 3/2021 |

* cited by examiner

INFORMATION PROCESSING APPARATUS, INFORMATION PROCESSING METHOD, AND SENSING SYSTEM

FIELD

The present disclosure relates to an information processing apparatus, an information processing method, and a sensing system.

BACKGROUND

Conventionally, a technique of receiving an operation according to behavior of a user in a wide range and a technique of receiving a movement of an object other than a person are known. For example, in a field of virtual reality, augmented reality, mixed reality, or projection mapping, an attitude detection function, a photographing function, and a display function of a device are used. As a result, an input operation according to a gesture by the user or a movement of an object other than the user can be performed.

CITATION LIST

Patent Literature

Patent Literature 1: JP 2017-41187 A

SUMMARY

Technical Problem

In a system that performs an input operation according to a gesture by a user or a motion of an object other than the user, a sensor detects a motion or a position of a finger, a hand, an arm, or an object other than a person, and an input operation is performed with assistance of performance including a virtual hand or a pointer configured in a virtual space, a virtual object, or visual sense for feedback. Therefore, in a case where an output error or a processing time of a three-dimensional position sensor for detecting a motion or a position of a finger, a hand, an arm of a person, or an object other than a person is large, there is an issue that a sense of discomfort may occur with respect to an input.

To address this problem, a method of reducing the number of processed data by position correction using a low-pass filter, downsampling, or the like is considered. However, the processing by the low-pass filter causes deterioration of responsiveness. In addition, the reduction in the number of processed data has an issue that the resolution of motion and position information decreases, and it becomes difficult to acquire fine motion and position.

In addition, Patent Literature 1 discloses a technique for improving stability and responsiveness of a pointing position by a user in virtual reality by using a three-dimensional distance camera and a wrist device including an inertial sensor and a transmitter mounted on a human body. However, in Patent Literature 1, the user needs to wear the wrist device, and the target input is only a pointing input of a person estimated from the position of the elbow and the orientation of the forearm.

The present disclosure provides an information processing apparatus, an information processing method, and a sensing system capable of improving display stability and responsiveness according to a wide range of a movement of a person or an object other than a person.

Solution to Problem

For solving the problem described above, an information processing apparatus according to one aspect of the present disclosure has a recognition unit configured to perform recognition processing on the basis of a point cloud output from a photodetection ranging unit using a frequency modulated continuous wave to determine a designated area in a real object, the photodetection ranging unit being configured to output the point cloud including velocity information and three-dimensional coordinates of the point cloud on the basis of a reception signal reflected by an object and received, and configured to output three-dimensional recognition information including information indicating the determined designated area; and a correction unit configured to correct three-dimensional coordinates of the designated area in the point cloud on the basis of the three-dimensional recognition information output by the recognition unit.

An information processing method according to one aspect of the present disclosure executed by a processor, comprising:

- a recognition step for performing recognition processing on the basis of a point cloud output from a photodetection ranging unit using a frequency modulated continuous wave to determine a designated area in a real object, the photodetection ranging unit being configured to output the point cloud including velocity information and three-dimensional coordinates of the point cloud on the basis of a reception signal reflected by an object and received, and configured to output three-dimensional recognition information including information indicating the determined designated area; and
- a correction step for correcting three-dimensional coordinates of the designated area in the point cloud on the basis of the three-dimensional recognition information output in the recognition step.

For solving the problem described above, a sensing system according to one aspect of the present disclosure has a photodetection ranging unit using a frequency modulated continuous wave configured to output a point cloud including velocity information and three-dimensional coordinates of the point cloud on the basis of a reception signal reflected by an object and received; a recognition unit configured to perform recognition processing on the basis of the point cloud to determine a designated area in a real object, and configured to output three-dimensional recognition information including information indicating the determined designated area; and a correction unit configured to correct three-dimensional coordinates of the designated area in the point cloud on the basis of the three-dimensional recognition information output by the recognition unit.

DESCRIPTION OF EMBODIMENTS

Figure 1:
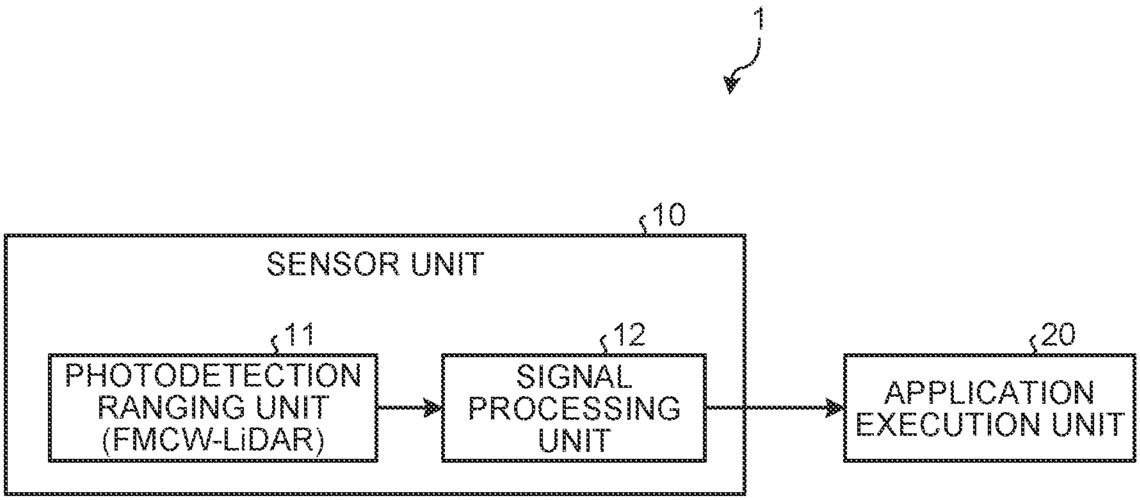
FIG. 1 is a block diagram illustrating an exemplary configuration of a sensing system applicable to embodiments of the present disclosure.

The description is now given of embodiments of the present disclosure in detail with reference to the drawings. Moreover, in embodiments described below, the same components are denoted by the same reference numerals, and so a description thereof is omitted.

Embodiments of the present disclosure are now described in the following order.

1. Summary of Present Disclosure
 1-1. LiDAR
 1-2. FMCW-LiDAR
 1-3. Configuration Applicable to Present Disclosure
2. First Embodiment
 2-1. First Modification of First Embodiment
 2-2. Second Modification of First Embodiment
3. Second Embodiment
 3-1. Modification of Second Embodiment
4. Third Embodiment
5. Fourth Embodiment

1. Summary of Present Disclosure

The present disclosure relates to a technique suitable for use in displaying a virtual object in a virtual space in accordance with a gesture by a person or a movement of an object other than a person. In the present disclosure, a movement of a person or an object other than a person is detected by performing range-finding on these targets. Prior to the description of each exemplary embodiment of the present disclosure, a range-finding method for detecting movement of a person or an object other than a person applied to the present disclosure will be schematically described.

Hereinafter, unless otherwise specified, a person or an object other than a person present in the real space, which is a target of range-finding, is collectively referred to as a "real object".

1-1. LiDAR

As a method for detecting movement of a real object, a method using laser imaging detection and ranging (LiDAR) is known. The LiDAR is a photodetection ranging apparatus that measures a distance to a target object based on a light reception signal obtained by receiving reflected light of laser light applied to the target object. In the LiDAR, a scanner that scans laser light, a focal plane array type detector as a light reception unit, and the like are used together. In LiDAR, range-finding is performed for each angle in a scanning visual circle of laser light with respect to a space, and data called a point cloud is output on the basis of information of the angle and the distance.

The point cloud is obtained by sampling a position and a spatial structure of an object included in the scanning range of the laser light, and is generally output every frame time of a constant cycle. By performing calculation processing on the point cloud data, it is possible to detect and recognize an accurate position, posture, and the like of the target object.

In the LiDAR, a measurement result is less likely to be affected by external light due to its operation principle, so that a target object can be stably detected and recognized even under a low illuminance environment, for example. Various methods of photodetection ranging method using LiDAR have been conventionally proposed. For long-distance measurement applications, a pulse time-of-flight (ToF) method combining pulse modulation and direct detection has become widespread. Hereinafter, a photodetection ranging method with a pulse ToF using LiDAR is appropriately referred to as dToF (direct ToF)-LiDAR.

In the dToF-LiDAR, a point cloud is generally output at constant cycles (frames). By comparing the point clouds of the frames, it is possible to estimate the movement (moving velocity, direction, etc.) of the object detected in the point clouds.

1-2. FMCW-LiDAR

Here, frequency modulated continuous wave (FMCW)-LiDAR as one of photodetection ranging methods using LiDAR will be described. In the FMCW-LiDAR, as laser light to be emitted, chirp light in which the frequency of a pulse is linearly changed, for example, with the lapse of time is used. In the FMCW-LiDAR, range-finding is performed by coherent detection on a reception signal obtained by combining laser light emitted as chirp light and reflected light of the emitted laser light.

In the FMCW-LiDAR, the velocity can be measured simultaneously with the range-finding by using the Doppler effect. Therefore, by using the FMCW-LiDAR, it is easy to quickly grasp the position of an object having a velocity, such as a person or another moving object. Therefore, in the present disclosure, a real object is detected and recognized using FMCW-LiDAR. This makes it possible to detect the movement of the real object with high responsiveness and reflect the movement in display or the like.

1-3. Configuration Applicable to Present Disclosure

The configuration applicable to the present disclosure is now described. FIG. 1 is a block diagram illustrating an exemplary configuration of a sensing system 1 applicable to embodiments of the present disclosure. In FIG. 1, the sensing system 1 includes a sensor unit 10 and an application execution unit 20 that executes a predetermined operation according to an output signal output from the sensor unit 10.

The sensor unit 10 includes a photodetection ranging unit 11 and a signal processing unit 12. FMCW-LiDAR that performs range-finding using frequency-continuously modulated laser light is applied to the photodetection ranging unit 11. The detection and ranging results by the photodetection ranging unit 11 are supplied to the signal processing unit 12 as point cloud information having three-dimensional spatial information. The signal processing unit 12 executes signal processing on the detection and ranging results supplied from the photodetection ranging unit 11, and outputs information including attribute information and area information regarding an object.

Figure 2:
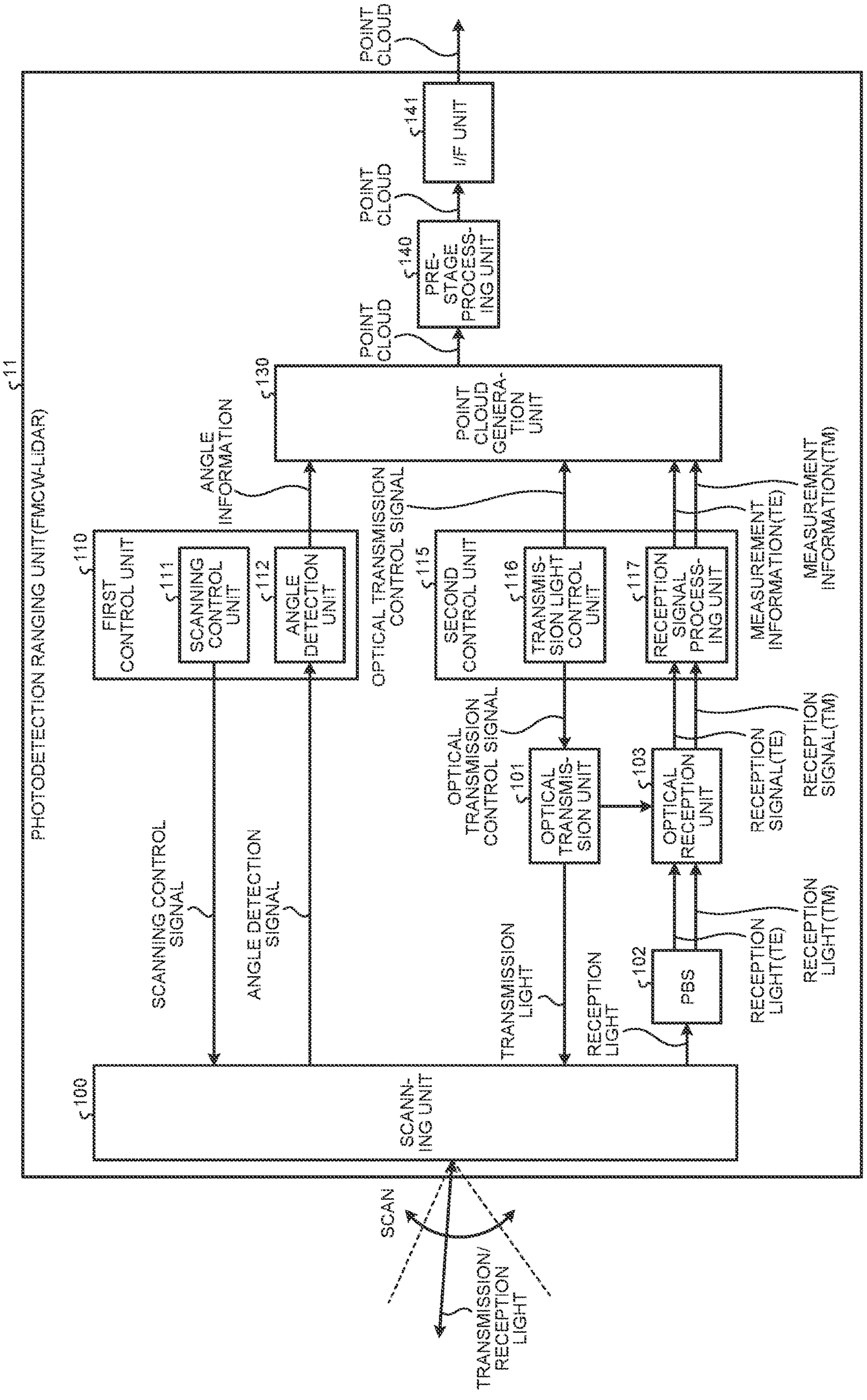
FIG. 2 is a block diagram illustrating an exemplary configuration of a photodetection ranging unit applicable to embodiments of the present disclosure.

FIG. 2 is a block diagram illustrating an exemplary configuration of the photodetection ranging unit 11 applicable to embodiments of the present disclosure. In FIG. 2, the photodetection ranging unit 11 includes a scanning unit 100, an optical transmission unit 101, a polarization beam splitter (PBS) 102, an optical reception unit 103, a first control unit 110, a second control unit 115, a point cloud generation unit 130, a pre-stage processing unit 140, and an interface (I/F) unit 141.

The first control unit 110 includes a scanning control unit 111 and an angle detection unit 112, and controls scanning by the scanning unit 100. The second control unit 115 includes a transmission light control unit 116 and a reception signal processing unit 117, and performs control of transmission of laser light by the photodetection ranging unit 11 and processing on the reception light.

The optical transmission unit 101 includes, for example, a light source such as a laser diode for emitting laser light as transmission light, an optical system for emitting light emitted by the light source, and a laser output modulation apparatus for driving the light source. The optical transmission unit 101 causes the light source to emit light in accordance with an optical transmission control signal supplied from a transmission light control unit 116 to be described later, and emits transmission light based on chirp light whose frequency linearly changes within a predetermined frequency range with the lapse of time. The transmission light is transmitted to the scanning unit 100 and is transmitted to the optical reception unit 103 as local light.

The transmission light control unit 116 generates a signal whose frequency linearly changes (for example, increases) within a predetermined frequency range with the lapse of time. Such a signal whose frequency linearly changes within a predetermined frequency range with the lapse of time is referred to as a chirp signal. The transmission light control unit 116 is a modulation synchronization timing signal input to the laser output modulation apparatus included in the optical transmission unit 101 on the basis of the chirp signal. An optical transmission control signal is generated. The transmission light control unit 116 supplies the generated optical transmission control signal to the optical transmission unit 101 and the point cloud generation unit 130.

The reception light received by the scanning unit 100 is polarized and separated by the PBS 102, and is emitted from the PBS 102 as reception light (TM) based on TM polarized light (p-polarized light) and reception light (TE) by TE polarized light (s-polarized light). The reception light (TM) and the reception light (TE) emitted from the PBS 102 are input to the optical reception unit 103.

The optical reception unit 103 includes, for example, a light reception unit (TM) and a light reception unit (TE) that receive input reception light (TM) and reception light (TE), respectively, and drive circuits that drives the light reception unit (TM) and the light reception unit (TE). For example, a pixel array in which light receiving elements such as photodiodes constituting pixels are arranged in a two-dimensional lattice pattern can be applied to the light receiving unit (TM) and the light receiving unit (TE).

The optical reception unit 103 further includes a combining unit (TM) and a combining unit (TE) that combine the reception light (TM) and the reception light (TE) having been input with the local light transmitted from the optical transmission unit 101. If the reception light (TM) and the reception light (TE) are reflected light from an object of the transmission light, the reception light (TM) and the reception light (TE) are signals delayed from the local light according to the distance to the object, and each combined signal obtained by combining the reception light (TM) and the reception light (TE) with the local light is a signal (beat signal) of a constant frequency. The optical reception unit 103 supplies signals corresponding to the reception light (TM) and the reception light (TE) to the reception signal processing unit 117 as a reception signal (TM) and a reception signal (TE), respectively.

The reception signal processing unit 117 performs signal processing such as fast Fourier transform on each of the reception signal (TM) and the reception signal (TE) supplied from the optical reception unit 103. The reception signal processing unit 117 obtains the distance to the object and the velocity indicating the velocity of the object by the signal processing, and generates measurement information (TM) and measurement information (TE) including distance information and velocity information indicating the distance and the velocity, respectively. The reception signal processing unit 117 may further obtain reflectance information indicating the reflectance of the object on the basis of the reception signal (TM) and the reception signal (TE) and include the reflectance information in the measurement information. The reception signal processing unit 117 supplies the generated measurement information to the point cloud generation unit 130.

The scanning unit 100 transmits transmission light transmitted from the optical transmission unit 101 at an angle according to a scanning control signal supplied from the scanning control unit 111, and receives light incident from the angle as reception light. In the scanning unit 100, for example, a two-axis mirror scanning device can be applied as a scanning mechanism of transmission light. In this case, the scanning control signal is, for example, a drive voltage signal applied to each axis of the two-axis mirror scanning device.

The scanning control unit 111 generates a scanning control signal for changing the transmission/reception angle by the scanning unit 100 within a predetermined angular range, and supplies the scanning control signal to the scanning unit 100. The scanning unit 100 can execute scanning in a certain range using the transmission light according to the supplied scanning control signal.

The scanning unit 100 includes a sensor that detects an emission angle of the transmission light to be emitted, and outputs an angle detection signal indicating the emission angle of the transmission light detected by the sensor. The angle detection unit 112 obtains a transmission/reception angle on the basis of the angle detection signal output from the scanning unit 100, and generates angle information indicating the obtained angle. The angle detection unit 112 supplies the generated angle information to the point cloud generation unit 130.

Figure 3:
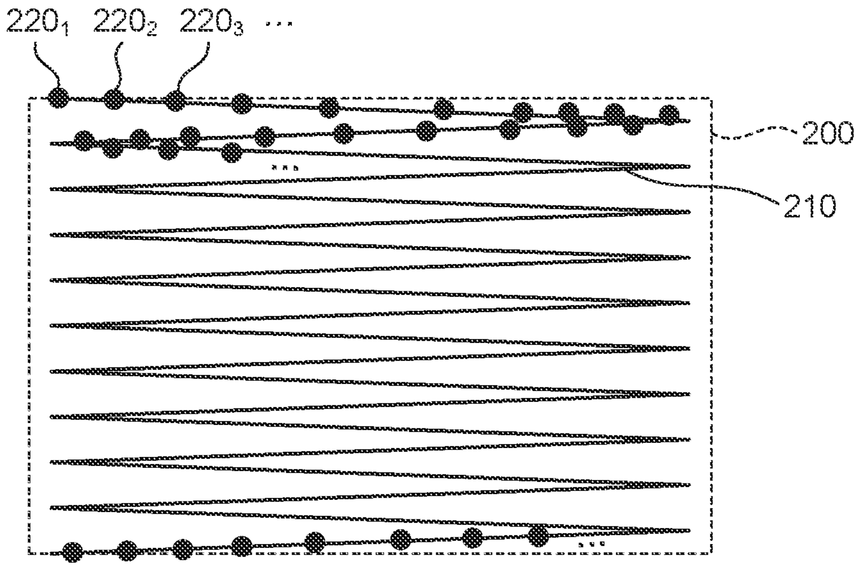
FIG. 3 is a schematic diagram schematically illustrating an example of scanning of transmission light by a scanning unit.

FIG. 3 is a schematic diagram schematically illustrating an example of scanning of transmission light by the scanning unit 100. The scanning unit 100 performs scanning according to a predetermined number of scanning lines 210 within a predetermined angular range 200. The scanning line 210 corresponds to one trajectory obtained by scanning between the left end and the right end of the angular range 200. The scanning unit 100 scans between the upper end and the lower end of the angular range 200 according to the scanning line 210 in response to the scanning control signal.

At this time, in accordance with the scanning control signal, the scanning unit 100 sequentially and discretely changes the emission point of the chirp light along the scanning line 210 at, for example, constant time intervals (point rates), for example, points $\mathbf{220}_1$, $\mathbf{220}_2$, $\mathbf{220}_3$, . . . . At this time, in the vicinity of the turning points at the left end and the right end of the angular range 200 of the scanning line 210, the scanning speed by the two-axis mirror scanning device decreases. Therefore, the points $\mathbf{220}_1$, $\mathbf{220}_2$, $\mathbf{220}_3$, . . . are not arranged in a grid in the angular range 200. Note that the optical transmission unit 101 may emit chirp light to one emission point one or a plurality of times in accordance with the optical transmission control signal supplied from the transmission light control unit 116.

Returning to the description of FIG. 2, the point cloud generation unit 130 generates a point cloud on the basis of the angle information supplied from the angle detection unit 112, the optical transmission control signal supplied from the transmission light control unit 116, and the measurement information supplied from the reception signal processing unit 113. More specifically, the point cloud generation unit 130 specifies one point in the space by the angle and the distance on the basis of the angle information and the distance information included in the measurement information. The point cloud generation unit 130 acquires a point cloud as a set of the specified points under a predetermined condition. The point cloud generation unit 130 obtains a point cloud on the basis of the velocity information included in the measurement information in consideration of the velocity of each specified point. That is, the point cloud includes information indicating three-dimensional coordinates and velocity for each point included in the point cloud.

The point cloud generation unit 130 supplies the obtained point cloud to the pre-stage processing unit 140. The pre-stage processing unit 140 performs predetermined signal processing such as format transformation on the supplied point cloud. The point cloud subjected to the signal processing by the pre-stage processing unit 140 is output to the outside of the photodetection ranging unit 11 via the I/F unit 141.

Although not illustrated in FIG. 2, the point cloud generation unit 130 may output each piece of information (distance information, velocity information, reflectivity information, etc.) included in each piece of measurement information (TM) and measurement information (TE) supplied from the reception signal processing unit 117 to the outside via the pre-stage processing unit 140 and the I/F unit 141.

Figure 4:
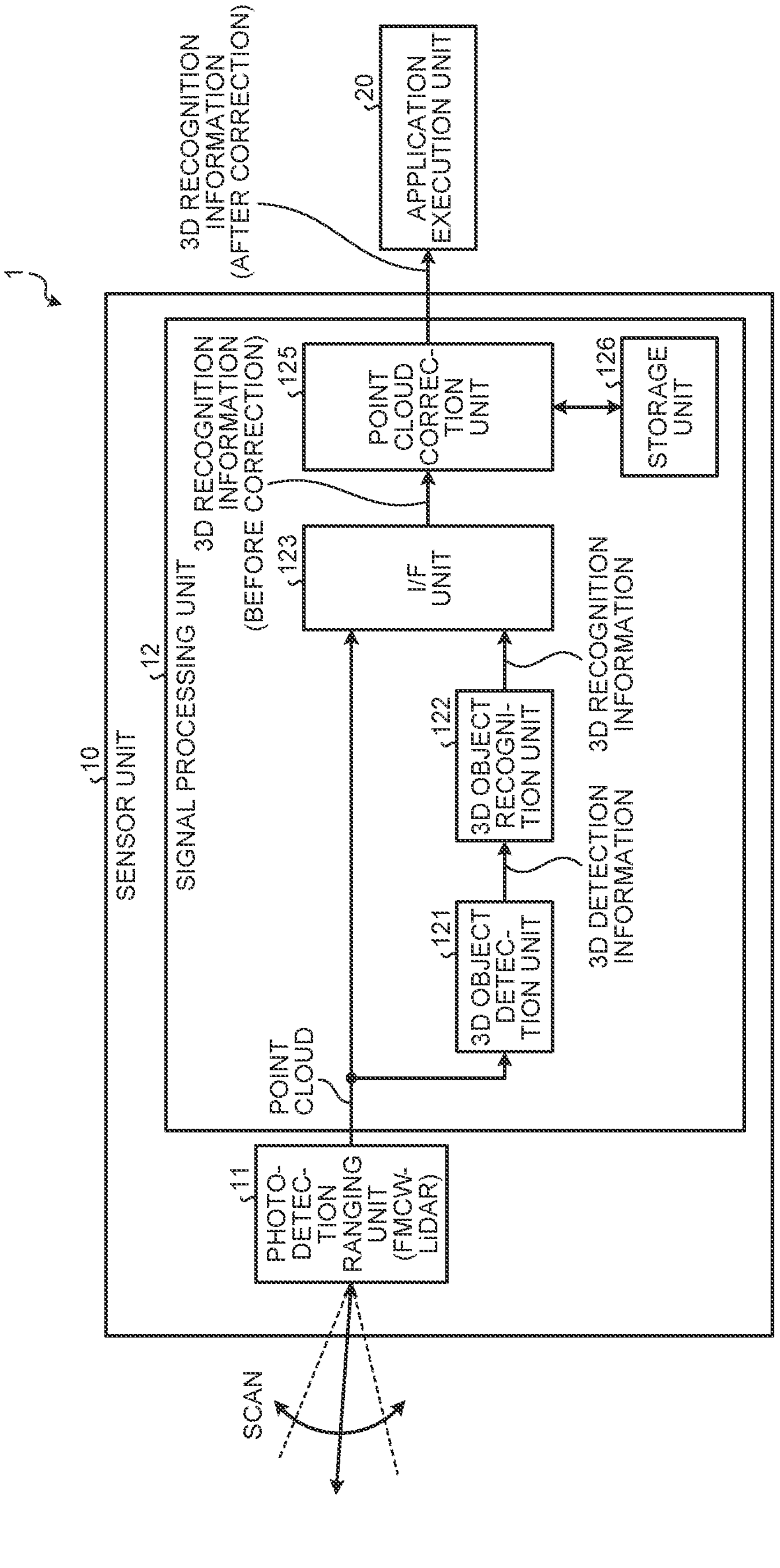
FIG. 4 is a block diagram illustrating an exemplary configuration of a sensing system according to the present disclosure.

FIG. 4 is a block diagram illustrating an exemplary configuration of the sensing system according to the present disclosure. In FIG. 4, the sensing system 1 includes a sensor unit 10 and an application execution unit 20. The sensor unit 10 includes a photodetection ranging unit 11 and a signal processing unit 12. The signal processing unit 12 includes a three dimensions (3D) object detection unit 121, a 3D object recognition unit 122, an I/F unit 123, a point cloud correction unit 125, and a storage unit 126.

The 3D object detection unit 121, the 3D object recognition unit 122, the I/F unit 123, and the point cloud correction unit 125 can be configured by executing an information processing program according to the present disclosure on a processor such as a central processing unit (CPU). Not limited to this, some or all of the 3D object detection unit 121, the 3D object recognition unit 122, the I/F unit 123, and the point cloud correction unit 125 may be configured by hardware circuits that operate in cooperation with each other.

The point cloud output from the photodetection ranging unit 11 is input to the signal processing unit 12, and is supplied to the I/F unit 123 and the 3D object detection unit 121 in the signal processing unit 12.

The 3D object detection unit 121 detects measurement points indicating a 3D object included in the supplied point cloud. Note that, in the following, in order to avoid complexity, an expression such as "detecting measurement points indicating a 3D object included in a combined point cloud" is described as "detecting a 3D object included in a combined point cloud" or the like.

The 3D object detection unit 121 detects, as a point cloud corresponding to the 3D object (referred to as a localized point cloud), a point cloud having a velocity and a point cloud including the point cloud and being recognized for having a relationship of, for example, having a connection with a certain density or more from the point cloud. For example, in order to discriminate between a static object and a dynamic object included in the point cloud, the 3D object detection unit 121 extracts a point having a velocity absolute value equal to or greater than a certain value from the point cloud. The 3D object detection unit 121 detects, as a localized point cloud corresponding to the 3D object, a set of point clouds localized in a certain spatial range (corresponding to the size of the target object) from the point cloud based on the extracted points. The 3D object detection unit 121 may extract a plurality of localized point clouds from the point cloud.

The 3D object detection unit 121 acquires 3D coordinates and velocity information of each point in the detected localized point clouds. Furthermore, the 3D object detection unit 121 adds label information indicating a 3D object corresponding to the localized point clouds to the area of the detected localized point clouds. The 3D object detection unit 121 outputs the 3D coordinates, the velocity information, and the label information regarding the localized point clouds as 3D detection information indicating a 3D detection result.

The 3D object recognition unit 122 acquires the 3D detection information output from the 3D object detection unit 121. The 3D object recognition unit 122 performs object recognition on the localized point clouds indicated by the 3D detection information on the basis of the acquired 3D detection information. For example, in a case where the number of points included in the localized point cloud indicated by the 3D detection information is equal to or more than a predetermined number that can be used to recognize the target object, the 3D object recognition unit 122 performs the point cloud recognition processing on the localized point cloud. The 3D object recognition unit 122 estimates the attribute information on the recognized object by the point cloud recognition processing.

The 3D object recognition unit 122 executes object recognition processing on a localized point cloud corresponding to a 3D object among the point clouds output from the photodetection ranging unit 11. For example, the 3D object recognition unit 122 removes point clouds of a portion other than the localized point cloud in the point clouds output from the photodetection ranging unit 11, and does not execute the object recognition processing on the portion. Therefore, it is possible to reduce the load of the recognition processing by the 3D object recognition unit 122.

When the certainty factor of the estimated attribute information is equal to or greater than a certain value, that is, when the recognition processing can be executed significantly, the 3D object recognition unit 122 outputs the recognition result for the localized point cloud as the 3D recognition information. The 3D object recognition unit 122 can include 3D coordinates regarding the localized point cloud, velocity information, attribute information, the position, size, and posture of the recognized object, and the certainty factor in the 3D recognition information.

Note that the attribute information is information indicating the attribute of the target object such as the type and the unique classification of the target object to which the unit belongs for each point of the point cloud as a result of the recognition processing. When the target object is a person, the attribute information can be expressed as, for example, a unique numerical value assigned to each point of the point cloud and belonging to the person.

The 3D recognition information output from the 3D object recognition unit 122 is input to the I/F unit 123. As described above, the point cloud output from the photodetection ranging unit 11 is also input to the I/F unit 123. The I/F unit 123 integrates the point cloud with the 3D recognition information and supplies the integrated recognition information to the point cloud correction unit 125. Here, the 3D recognition information supplied to the point cloud correction unit 125 is 3D recognition information before being corrected by the point cloud correction unit 125.

The point cloud correction unit 125 corrects the position information regarding the localized point cloud included in the 3D recognition information with respect to the 3D recognition information supplied from the I/F unit 123. The point cloud correction unit 125 may perform this correction by estimating the position information regarding the localized point cloud acquired at present using the past 3D recognition information regarding the localization point cloud stored in the storage unit 126. For example, the point cloud correction unit 125 predicts the position information of the current localized point cloud on the basis of the velocity information included in the past 3D recognition information.

The point cloud correction unit 125 supplies the corrected 3D recognition information to the application execution unit 20. Furthermore, the point cloud correction unit 125 accumulates and stores, for example, the velocity information and the position information included in the 3D recognition information in the storage unit 126 as past information.

The application execution unit 20 is configured according to a predetermined program in a general information processing apparatus including, for example, a central processing unit (CPU), a memory, a storage device, and the like. The present invention is not limited thereto, and the application execution unit 20 may be realized by specific hardware.

2. First Embodiment

The description is now given of a first embodiment of the present disclosure. The first embodiment is an example in which a virtual object for operation projected on a wall surface or the like can be operated by a gesture of a user who is an operator.

Figure 5:
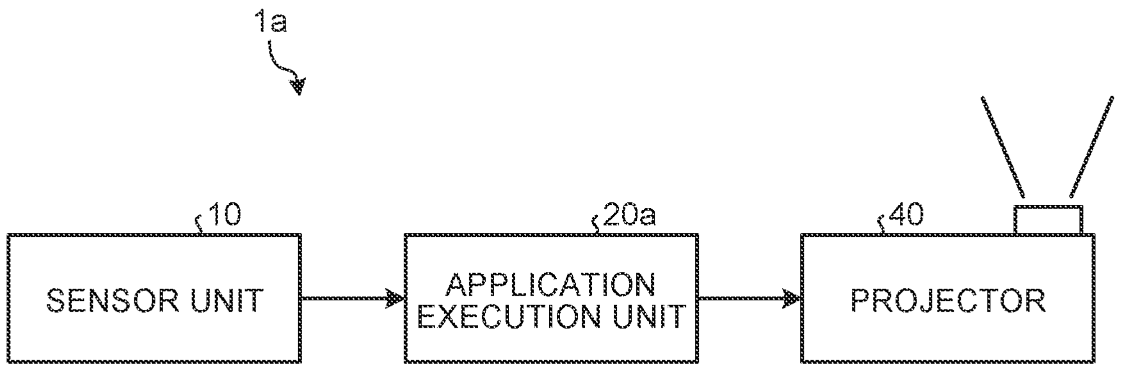
FIG. 5 is a block diagram illustrating an exemplary configuration of a sensing system according to a first embodiment.

FIG. 5 is a block diagram illustrating an exemplary configuration of a sensing system according to the first embodiment. In FIG. 5, a sensing system 1*a* includes a sensor unit 10, an application execution unit 20*a*, and a projector 40.

The application execution unit 20*a* can generate a display signal for projecting an image by the projector 40. For example, the application execution unit 20*a* generates a display signal for projecting an image corresponding to the corrected 3D recognition result supplied from the sensor unit 10. Furthermore, the application execution unit 20*a* can also generate a display signal for projecting a fixed image or a display signal for projecting an image corresponding to the corrected 3D recognition result on a fixed image in a superimposed manner. The projector 40 projects an image corresponding to the display signal generated by the application execution unit 20*a* onto a projection target such as a wall surface.

Figure 6:
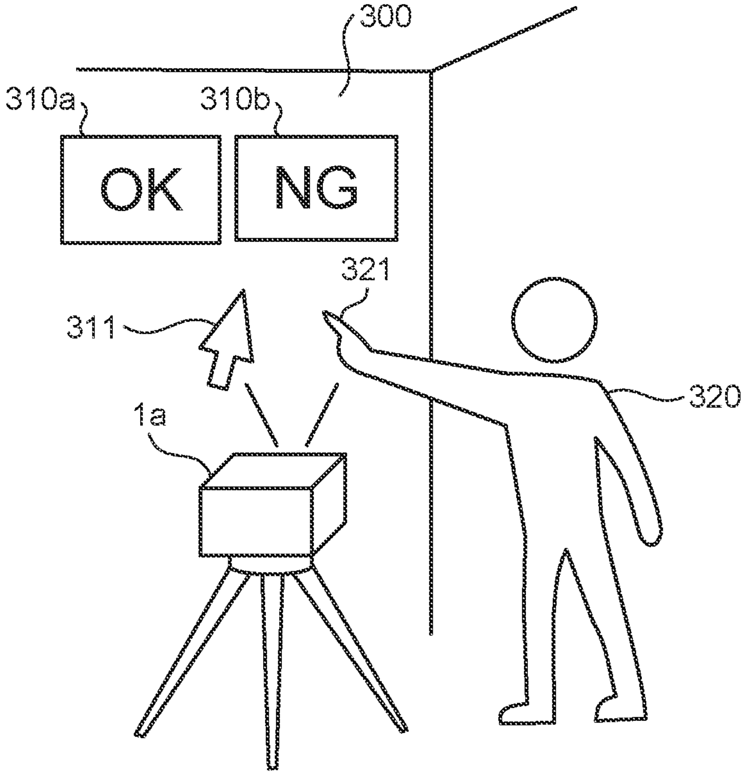
FIG. 6 is a schematic diagram for explaining exemplary usage of the sensing system according to the first embodiment.

FIG. 6 is a schematic diagram for explaining exemplary usage of the sensing system according to the first embodiment. In FIG. 6, the sensing system 1*a* according to the first embodiment projects button images 310*a* and 310*b* as operated images and projects a cursor image 311 as an operation image on a wall surface 300 as a fixed surface, for example, a screen by the projector 40. The sensing system 1*a* detects and recognizes the real object, that is, a hand 321 of an operator 320 by the sensor unit 10, and moves the cursor image 311 according to the movement of the hand 321.

For example, the application execution unit 20*a* may execute predetermined processing in a case where at least a part of the cursor image 311 overlaps the button image 310*a*, for example, according to the movement of the hand 321. As an example, in this case, the application execution unit 20*a* changes the button image 310*a* to an image indicating that the button image 310*a* is on a selection standby state.

Further, when it is detected that the hand 321 intersects with the moving surface of the cursor image 311 and moves in the direction toward the button image 310*a* in a state where at least a part of the cursor image 311 overlaps the button image 310*a*, for example, on the basis of the output of the sensor unit 10, the application execution unit 20*a* may determine that the button image 310*a* is selected and execute the function associated with the button image 310*a*.

Figure 7:
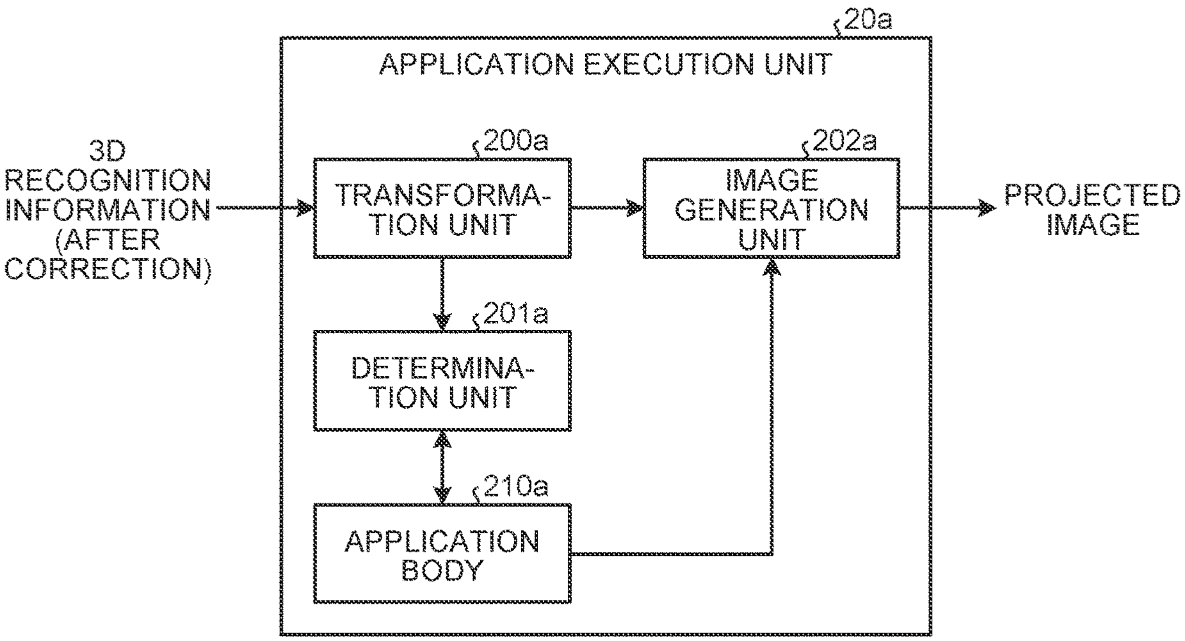
FIG. 7 is an exemplary functional block diagram illustrated to describe the functions of an application execution unit according to the first embodiment.

FIG. 7 is an exemplary functional block diagram illustrated to describe the functions of the application execution unit 20*a* according to the first embodiment. In FIG. 7, the application execution unit 20*a* includes a transformation unit 200*a*, a determination unit 201*a*, an image generation unit 202*a*, and an application body 210*a*.

The transformation unit 200*a*, the determination unit 201*a*, the image generation unit 202*a*, and the application body 210*a* are configured by, for example, executing a predetermined program on a CPU. Not limited to this, some or all of the transformation unit 200*a*, the determination unit 201*a*, the image generation unit 202*a*, and the application body 210*a* may be configured by hardware circuits that operate in cooperation with each other.

In FIG. 7, the application body 210*a* generates an operated image (button images 310*a* and 310*b* in the example of FIG. 6) operated by the user and an operation image (cursor image 311 in the example of FIG. 6) for the user to perform an operation. The application body 210*a* provides fixed coordinates to the operated image and initial coordinates to the operation image. The application body 210*a* passes the coordinates of the operated image to the determination unit 201*a*.

The transformation unit 200*a* transforms the 3D coordinates included in the corrected 3D recognition information supplied from the sensor unit 10 into coordinates on an object to be projected by the projector 40 (the wall surface 300 in the example of FIG. 6). The transformation unit 200*a* passes the transformed coordinates to the determination unit 201*a* and the image generation unit 202*a*. The coordinates passed from the transformation unit 200*a* to the image generation unit 202*a* are coordinates of an operation image on a projection target by the projector 40.

The determination unit 201*a* determines the overlap between the operation image and the operated image on the basis of the coordinates of the operated image and the coordinates of the operation image based on the 3D recognition information passed from the transformation unit 200*a*. Furthermore, in a case where at least a part of the operated image overlaps the operation image, the determination unit 201*a* determines whether or not the 3D coordinates for the operation image are changed toward the operated image with respect to the direction intersecting the display surface of the operated image on the basis of the velocity information included in the 3D recognition information, for example. For example, in a case where the 3D coordinates for the operation image are changed toward the operated image with respect to the direction intersecting the display surface of the operated image, it can be determined that the predetermined operation is performed on the operated image.

The determination unit 201*a* passes the determination result to the application body 210*a*. The application body 210*a* can execute a predetermined operation according to the determination result passed from the determination unit 201*a* and can update the operated image, for example. The application body 210*a* passes the updated operated image to the image generation unit 202*a*.

The image generation unit 202*a* generates an image to be projected by the projector 40 onto the projection target on the basis of the coordinates of the operated image and the operation image passed from the transformation unit 200*a* and the images of the operated image and the operation image passed from the application body 210*a*. The image generation unit 202*a* generates a display signal for projecting the generated image, and passes the generated display signal to the projector 40.

The projector 40 projects an image on the projection surface in accordance with the display signal passed from the image generation unit 202*a*.

Figure 8:
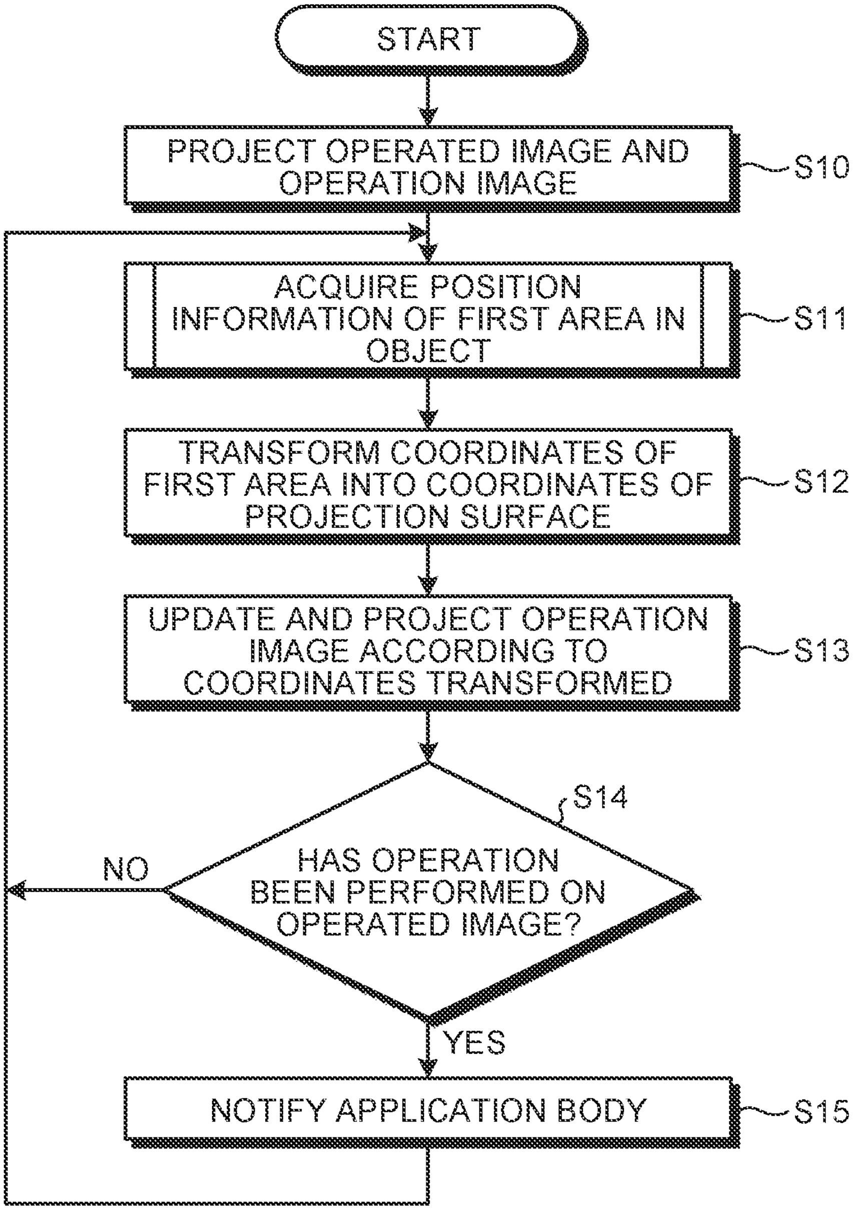
FIG. 8 is a flowchart of an example for explaining an operation by the sensing system according to the first embodiment.

FIG. 8 is a flowchart of an example for explaining an operation by the sensing system 1*a* according to the first embodiment. In FIG. 8, in step S10, the sensing system 1*a* causes the projector 40 to project the operated image and the operation image onto the projection target. In the next step S11, the sensing system 1*a* acquires the position information of the designated area in the real object by the sensor unit 10. Which region is set as the designated area can be designated in advance.

Note that the real object is, for example, a person who operates the operation image in the real space. In addition, the designated area is a part related to the operation of the operation image among parts of the person. For example, the designated area is a hand of the person or a finger protruding from the hand. The designated area is not limited to this, and may be a part including a forearm and a hand of the person, or may be a foot without being limited to the arm.

In the next step S12, the sensing system 1*a* causes the transformation unit 200*a* of the application execution unit 20*a* to transform the 3D coordinates of the designated area into coordinates of the projection surface. In the next step S13, the sensing system 1*a* updates the operation image according to the coordinates transformed by the transformation unit 200*a* in the image generation unit 202*a*. The updated operation image is projected onto the projection surface by the projector 40.

In the next step S14, in the sensing system 1*a*, the determination unit 201*a* of the application execution unit 20*a* determines whether or not an operation has been performed on the operated image using the operation image.

For example, the determination unit 201*a* may determine that the operation has been performed when at least a part of the operation image overlaps the operated image on the basis of the coordinates of the operation image transformed by the transformation unit 200*a* on the basis of the 3D coordinates of the designated area. Furthermore, in a case where at least a part of the operation image overlaps the operated image, the determination unit 201*a* may determine that the operation has been performed in a case where the operation of pressing the operation image is performed.

In step S14, when the determination unit 201*a* determines that no operation has been performed (step S14, "No"), the sensing system 1*a* returns the processing to step S11. On the other hand, when the determination unit 201*a* determines that the operation has been performed in step S14 (step S14, "Yes"), the sensing system 1*a* shifts the processing to step S15.

In step S15, the sensing system 1*a* notifies the application body 210*a* of the determination result indicating that the operation by the determination unit 201*a* has been performed. At this time, the sensing system 1*a* notifies the application body 210*a* of the content of the operation. The content of the operation can include, for example, information such as which operated image has been operated, and which of an operation in which at least a part of the operation image is overlapped on the operated image and a pressing operation on the operated image has been performed.

Upon completion of the processing in step S15, the sensing system 1*a* returns the processing to step S11.

Figure 9:
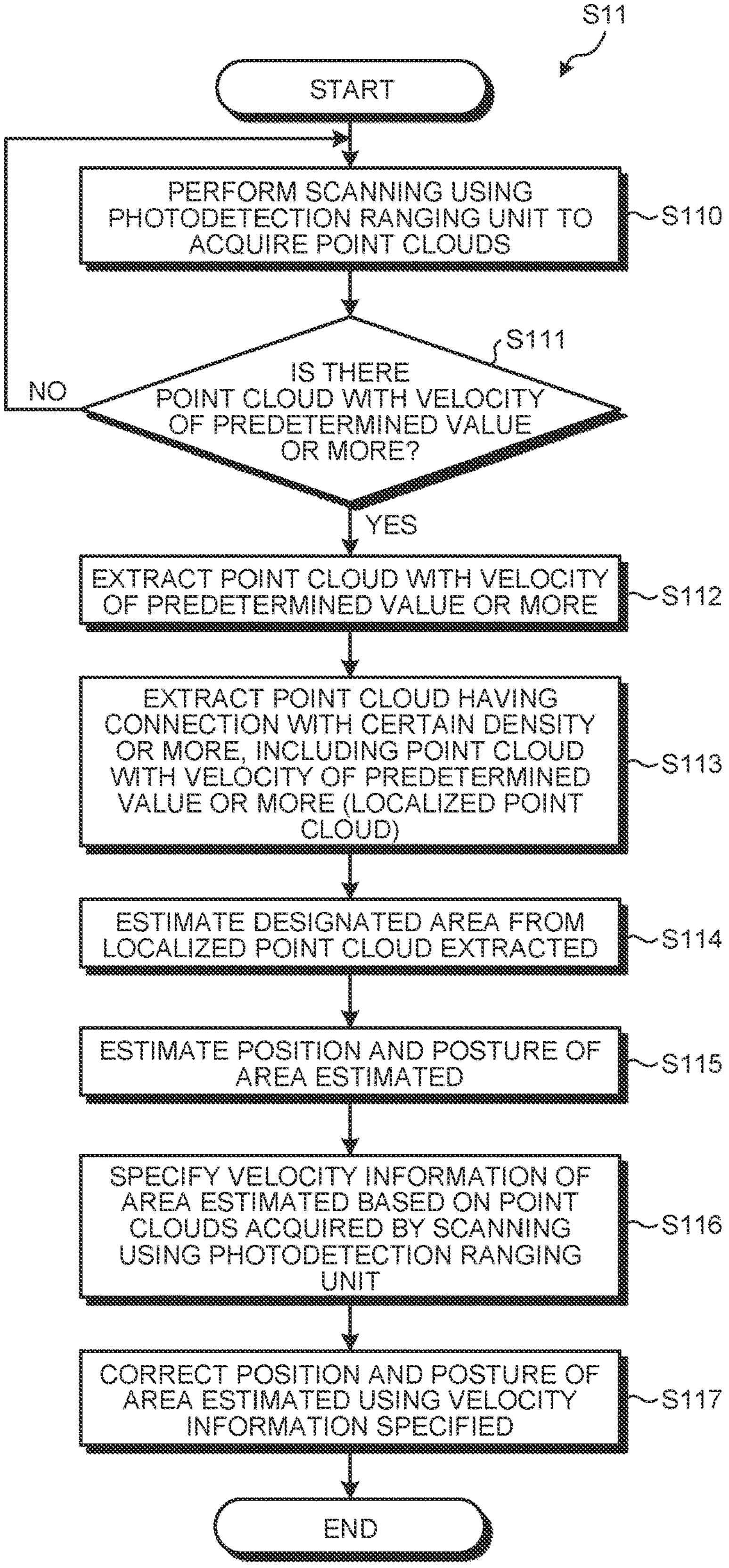
FIG. 9 is a flowchart of an example for explaining processing by a sensor unit according to the first embodiment.

FIG. 9 is a flowchart of an example for explaining processing by the sensor unit 10 according to the first embodiment. The flowchart of FIG. 9 illustrates the processing of step S1*l* in the flowchart of FIG. 8 described above in more detail.

In FIG. 9, in step S110, the sensor unit 10 performs scanning using the photodetection ranging unit 11 to acquire point clouds. It is assumed that the acquired point clouds include a point cloud corresponding to a real object as an operator who operates the operation image.

In the next step S111, the sensor unit 10 causes the 3D object detection unit 121 to determine whether or not there is a point cloud with the velocity of a predetermined value or more in the point clouds acquired in step S110. In a case where the 3D object detection unit 121 determines that there is no point cloud with the velocity of a predetermined value or more (step S111, "No"), the sensor unit 10 returns the processing to step S110. On the other hand, in a case where the 3D object detection unit 121 determines that there is a point cloud with the velocity of a predetermined value or more (step S111, "Yes"), the sensor unit 10 proceeds the processing to step S112.

In step S112, the sensor unit 10 causes the 3D object detection unit 121 to extract a point cloud with the velocity of a predetermined value or more out of the point clouds acquired in step S110. In the next step S113, the sensor unit 10 causes the 3D object detection unit 121 to extract, from the point clouds acquired in step S110, a point cloud including the point clouds extracted in step S112, having a connection with a certain density or more, for example, as a localized point cloud.

In this manner, by extracting a localized point cloud using the velocity information of the point cloud from the point cloud acquired by scanning using the photodetection ranging unit 11, the number of point clouds to be processed is reduced, and responsiveness can be improved.

In the next step S114, the sensor unit 10 estimates the designated area using the 3D object recognition unit 122 on the basis of the localized point cloud extracted in step S113. For example, in a case where the real object is a person, the designated area is an area corresponding to a portion indicating a position with respect to a space in the person, such as a hand, a finger protruding in the hand, or a forearm including the hand. For example, an area to be set as the designated area may be designated in advance for the sensing system 1.

In the next step S115, the sensor unit 10 estimates the position and posture of the designated area estimated in step S114 using the 3D object recognition unit 122. The posture of the designated area can be indicated by the direction of the long side or the short side, for example, when the designated area has a shape having long sides and short sides. In the next step S116, the sensor unit 10 specifies velocity information indicating the velocity of the designated area whose position and posture are estimated in step S115 by the point cloud correction unit 125 on the basis of the point cloud acquired in step S110.

The stability and responsiveness of the position and posture of the designated area can be improved by correcting the position and posture of the designated area using the velocity information of the point cloud complementarily.

In the next step S117, the sensor unit 10 causes the point cloud correction unit 125 to correct the position and orientation of the designated area estimated in step S115 using the velocity information specified in step S116. For example, the point cloud correction unit 125 can correct the current position and orientation of the designated area using the past position and orientation related to the designated area and the velocity information stored in the storage unit 126. At this time, the point cloud correction unit 125 can correct three-dimensional coordinates of the designated area with respect to a direction indicated by the designated area and a plane intersecting the direction. As a result, for example, it is possible to correct the three-dimensional coordinates related to the movement and selection (pressing) operation of the cursor image 311 according to the movement of the hand 321 of the user illustrated in FIG. 6.

The point cloud correction unit 125 passes the localized point cloud of the designated area whose position and posture have been corrected to the application execution unit 20*a*. In addition, the point cloud correction unit 125 stores the corrected information indicating the position and posture of the localized point cloud and the velocity information of the localized point cloud in the storage unit 126.

After the processing of step S117, the processing proceeds to the processing of step S12 of FIG. 8.

As described above, in the first embodiment, the sensor unit 10 extracts the localized point cloud corresponding to the designated area from the point cloud acquired by the scanning of the photodetection ranging unit 11. The sensor unit 10 corrects the position and posture of the designated area by the extracted localized point cloud using the velocity information of the point cloud acquired by the scanning of the photodetection ranging unit 11. This correction includes correction of the position and orientation of the designated area, which is estimated from the velocity information and the delay time information from acquisition of the distance by the photodetection ranging unit 11 to display of the cursor image 30 by the projector 40. Therefore, by applying the first embodiment, it is possible to improve the responsiveness by reducing the number of point clouds to be processed and improve the responsiveness by the position and posture estimation based on the velocity information and the delay time to display, and it is possible to improve the stability of the position and posture of the designated area.

For example, in a case where the moving velocity of the hand 321 as the designated area is equal to or higher than a certain value, coordinates to be used as the coordinates of the cursor image 311 are not the actually detected coordinates, but are coordinates on the projection target projected by the projector 40 (the wall surface 300 in the example of FIG. 6) transformed using coordinates estimated from the velocity information and the delay time to display. This processing can improve the display responsiveness of the cursor image 311.

Furthermore, for example, in a case where the moving velocity of the hand 321 as the designated area is less than a certain value, coordinates to be used as the coordinates of the cursor image 311 are coordinates on the projection target projected by the projector 40 (the wall surface 300 in the example of FIG. 6) transformed after performing position correction with a low-pass filter on the detected coordinates. This processing can improve the display stability of the cursor image 311.

The mechanism that prioritizes either stability or responsiveness according to the moving velocity can be finely defined based on the moving velocity, and switching with less discomfort can be performed.

Therefore, by applying the first embodiment, it is possible to improve display stability and responsiveness according to a wide range of movement of a person or an object other than a person.

Note that, in the above description, an example in which the first embodiment is applied in a case where the button images 310*a* and 310*b* projected on the wall surface 300 are operated by the cursor image 311 has been described, but this is not limited to this example. For example, the operated image is not limited to the button image, but may be a dial image or a switch image, and the projection surface may not be a flat surface. In addition, it is also possible to draw a picture or a character on the wall surface 300 or the virtual space by operating the operation image.

2-1. First Modification of First Embodiment

A first modification of the first embodiment is now described. In the first embodiment described above, one operator performs an operation using an operation image (cursor image 311). On the other hand, the first modification of the first embodiment is an example in which each of a plurality of operators performs an operation using an operation image.

Figure 10:
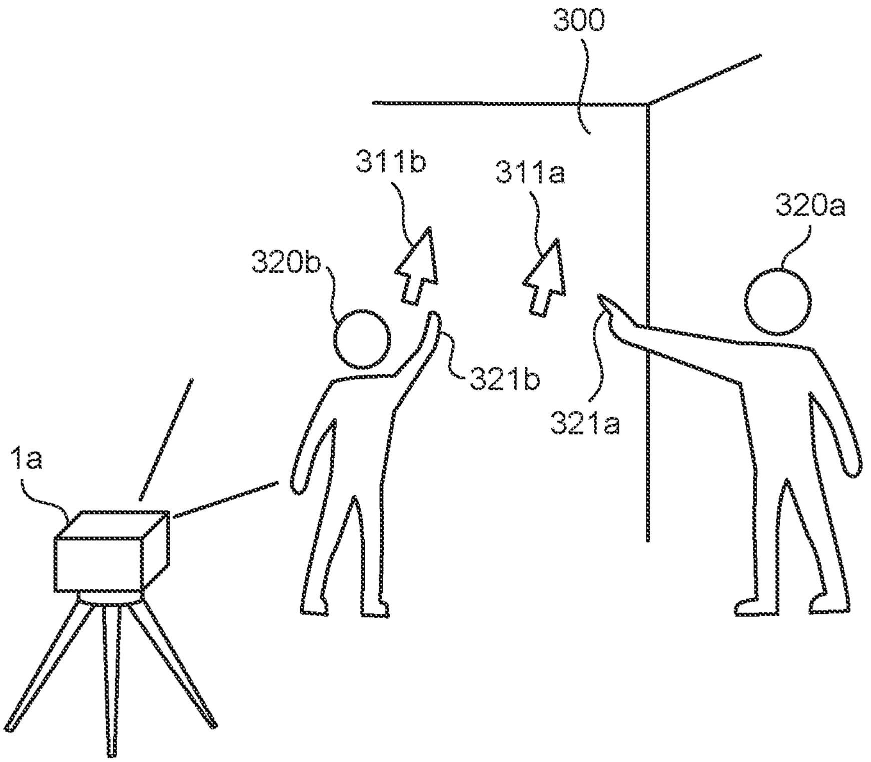
FIG. 10 is a schematic diagram for explaining exemplary usage of a sensing system according to a first modification of the first embodiment.

FIG. 10 is a schematic diagram for explaining exemplary usage of a sensing system according to the first modification of the first embodiment. In FIG. 10, the operated images (for example, the button images 310*a* and 310*b*) are omitted.

The example of FIG. 10 illustrates a state in which, of the two operators 320*a* and 320*b*, the operator 320*a* operates the cursor image 311*a* with a hand 321*a*, and the operator 320*b* operates the cursor image 311*b* with a hand 321*b*. The sensing system 1*a* estimates designated areas (hands, fingers protruding in hands, forearms including hands, etc.) of each of the operators 320*a* and 320*b* on the basis of a point cloud acquired by scanning of the photodetection ranging unit 11 in the sensor unit 10. The sensing system 1*a* can determine which one of the cursor images 311*a* and 311*b* is set as the operation target by each of the operators 320*a* and 320*b* on the basis of the position and posture of the designated area of each of the operators 320*a* and 320*b*.

That is, the sensing system 1*a* can acquire the gesture and the velocity information of the operator without restraining the action of the operator. Therefore, even in a case where there are a plurality of operators, each of the plurality of operators can use the sensing system 1*a* as in the case where there is one operator.

As an example, by applying the first modification of the first embodiment, it is possible to perform a stage performance such as changing an image projected on the wall surface 300 by a plurality of operators moving their bodies. In this case, it is conceivable that the designated area, which is a part related to the operation of the image, is the entire body of the operator.

2-2. Second Modification of First Embodiment

A second modification of the first embodiment is now described. In the first embodiment described above, an operator performs an operation using an operation image (cursor image 311). On the other hand, the second modification of the first embodiment is an example in which the operator performs an operation by fine and quick movement.

Figure 11:
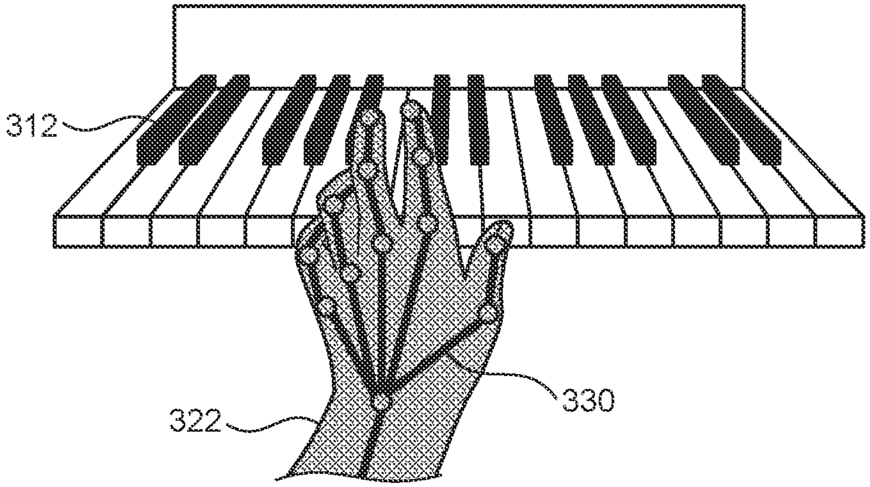
FIG. 11 is a schematic diagram for explaining exemplary usage of a sensing system according to a second modification of the first embodiment.

FIG. 11 is a schematic diagram for explaining exemplary usage of a sensing system according to the second modification of the first embodiment. Here, playing of a keyboard musical instrument is applied as an example of an operation by fine and quick movement.

In FIG. 11, the operator wears an eyeglass-type device corresponding to, for example, mixed reality (MR). It is considered that the eyeglass-type device corresponding to the MR includes a transmission type display unit, and is capable of mixing a scene in the virtual space and a scene in the outside world and displaying the mixture on the display unit.

The sensing system 1*a* causes the application execution unit 20*a* to display a keyboard musical instrument 312 (for example, a piano) on the virtual space as the operated image on the display unit of the eyeglass-type device that is MR compatible. The operator wearing the eyeglass-type device operates (plays) the keyboard musical instrument 312 in the virtual space displayed on the display unit of the eyeglass-type device with a hand 322 in the real space.

Note that the application execution unit 20*a* is configured to output a sound corresponding to the keyboard when detecting that the keyboard of the keyboard musical instrument 312 has been pressed.

The sensing system 1*a* recognizes the hand 322 of the operator by the sensor unit 10, and specifies a virtual hand 330 that is a hand on the virtual space as the designated area that is a part related to the operation of the image. Note that, in this example, since the hand 322 in the real space displayed on the display unit of the eyeglass-type device functions as an operation image, the application execution unit 20*a* does not need to generate an operation image separately.

In such a configuration, the FMCW-LiDAR applied to the photodetection ranging unit 11 can acquire the velocity information of the point cloud as described above. Therefore, the sensing system 1*a* can estimate the timing at which the position of the finger of the hand 322 in the real space reaches the keyboard in the virtual space using the velocity information of the virtual hand 330 corresponding to the hand 322, and can consider that the finger of the hand 322 has pressed the keyboard. Therefore, it is possible to suppress a delay in outputting the sound of the keyboard musical instrument 312 with respect to the movement of the finger of the hand 322 in the real space to be small.

3. Second Embodiment

The description is now given of a second embodiment. The second embodiment is an example in which the sensing system according to the present disclosure is applied to e-sports in which a competition is performed on a virtual space.

In e-sports, a player plays in a virtual space. In e-sports, the competition may be performed by the player operating a controller, or may be performed by the player moving the body similarly to the competition in the real space. In the second embodiment, the latter e-sports in which the player moves the body similarly to the competition in the real space are targeted.

Figure 12:
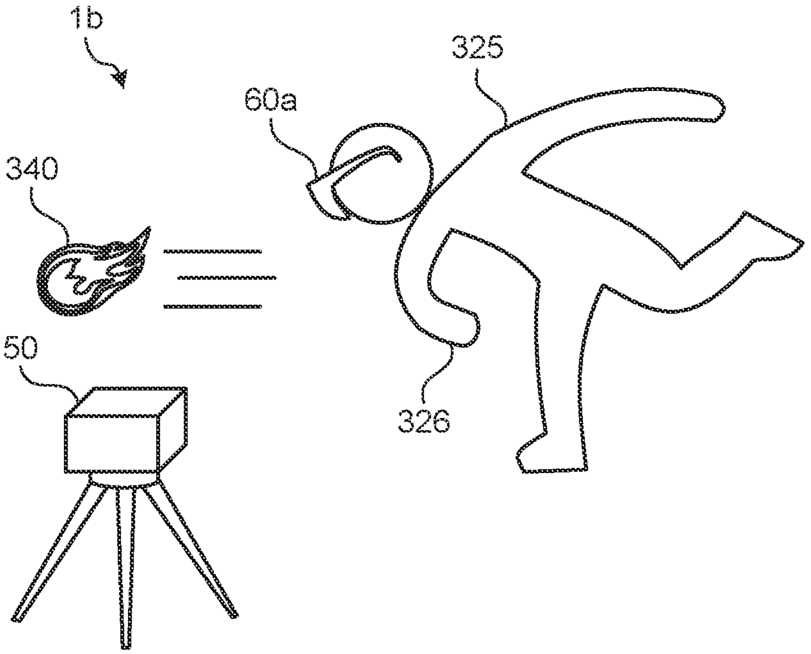
FIG. 12 is a schematic diagram for explaining exemplary usage of a sensing system according to a second embodiment.

FIG. 12 is a schematic diagram for explaining exemplary usage of a sensing system according to the second embodiment. In FIG. 12, a sensing system 1*b* includes an eyeglass-type device 60*a* worn by a player 325 and a motion measurement device 50 that measures the motion of the player 325. As the eyeglass-type device 60*a*, for example, it is preferable that the above-described MR-compatible device is used.

In this example, an e-sport including a motion in which the player 325 throws a virtual ball 340 is assumed. The virtual ball 340 is displayed on the display unit of the eyeglass-type device 60*a* and does not exist in the real space. The player 325 can observe the virtual ball 340 through the eyeglass-type device 60*a*.

The motion measurement device 50 includes a photodetection ranging unit 11, and scans a space including the player 325 to acquire a point cloud. The motion measurement device 50 recognizes a hand 326 as an operation area (designated area) in which the player 325 operates (throw, hold, receive, etc.) the virtual ball 340 on the basis of the acquired point cloud, and specifies the position and posture of the hand 326. At this time, the motion measurement device 50 corrects the specified position and posture of the hand 326 on the basis of the past position and posture of the hand 326 and the current velocity information. The motion measurement device 50 transmits 3D recognition information including information indicating the corrected position and posture of the hand 326 to the eyeglass-type device 60*a*.

The eyeglass-type device 60*a* causes the display unit to display the image of the virtual ball 340 on the basis of the 3D recognition information transmitted from the motion measurement device 50. The eyeglass-type device 60*a* estimates the behavior of the virtual ball 340 according to the 3D recognition information and specifies the position of the virtual ball 340. For example, when it is estimated that the player 325 holds the virtual ball 340 with the hand 326 on the basis of the 3D recognition information, the eyeglass-type device 60*a* sets the position of the virtual ball 340 to a position corresponding to the hand 326. Furthermore, for example, when it is estimated that the player 325 indicates a motion of throwing the virtual ball 340 on the basis of the 3D recognition information, the eyeglass-type device 60*a* releases the virtual ball from the hand 326 and moves the virtual ball 340 in a direction in which it is estimated that the virtual ball has been thrown as time passes.

Figure 13:
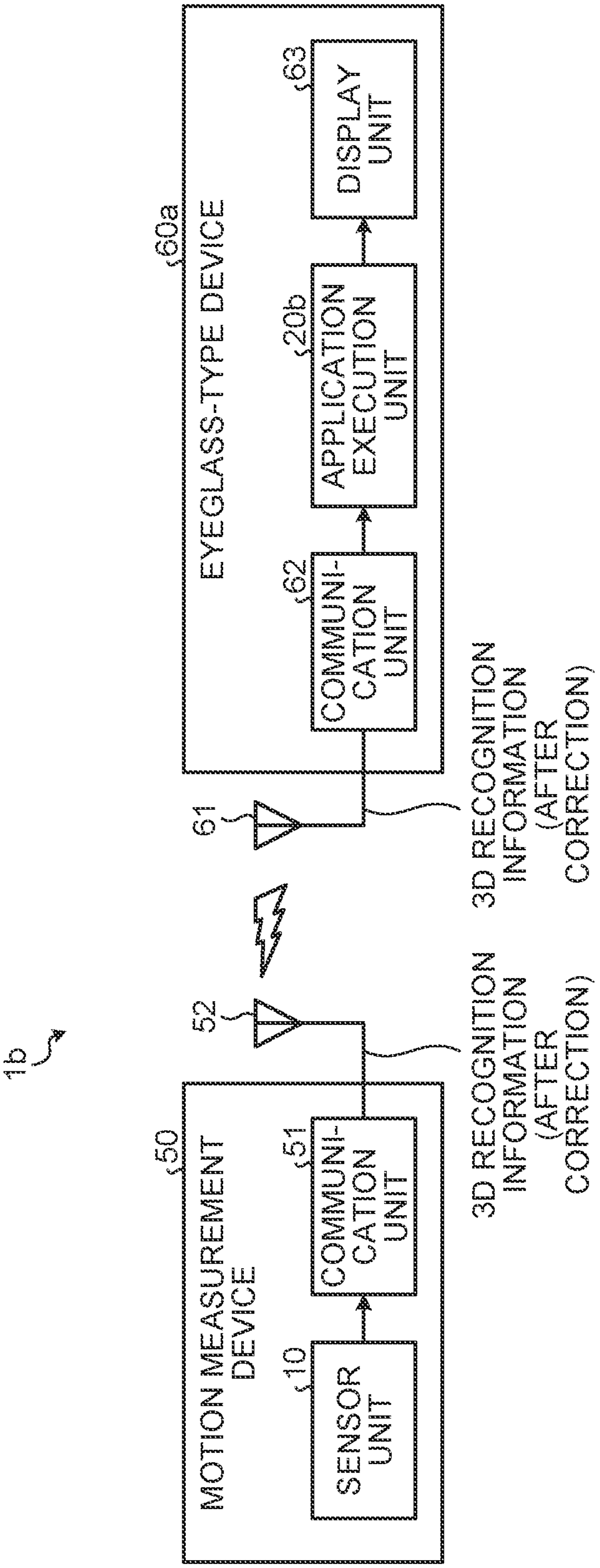
FIG. 13 is a block diagram illustrating an exemplary configuration of the sensing system according to the second embodiment.

FIG. 13 is a block diagram illustrating an exemplary configuration of the sensing system 1*b* according to the second embodiment. In FIG. 13, the motion measurement device 50 includes a sensor unit 10 and a communication unit 51. The communication unit 51 can transmit the corrected 3D recognition information output from the sensor unit 10 using an antenna 52.

The eyeglass-type device 60*a* includes a communication unit 62, an application execution unit 20*b*, and a display unit 63. The communication unit 62 receives the 3D recognition information transmitted from the motion measurement device 50 using an antenna 61 and passes the 3D recognition information to the application execution unit 20*b*. The application execution unit 20*b* updates or generates an image of the operated object (the virtual ball 340 in the example of FIG. 12) on the basis of the 3D recognition information. The updated or generated image of the operated object is sent to and displayed on the display unit 63.

Figure 14:
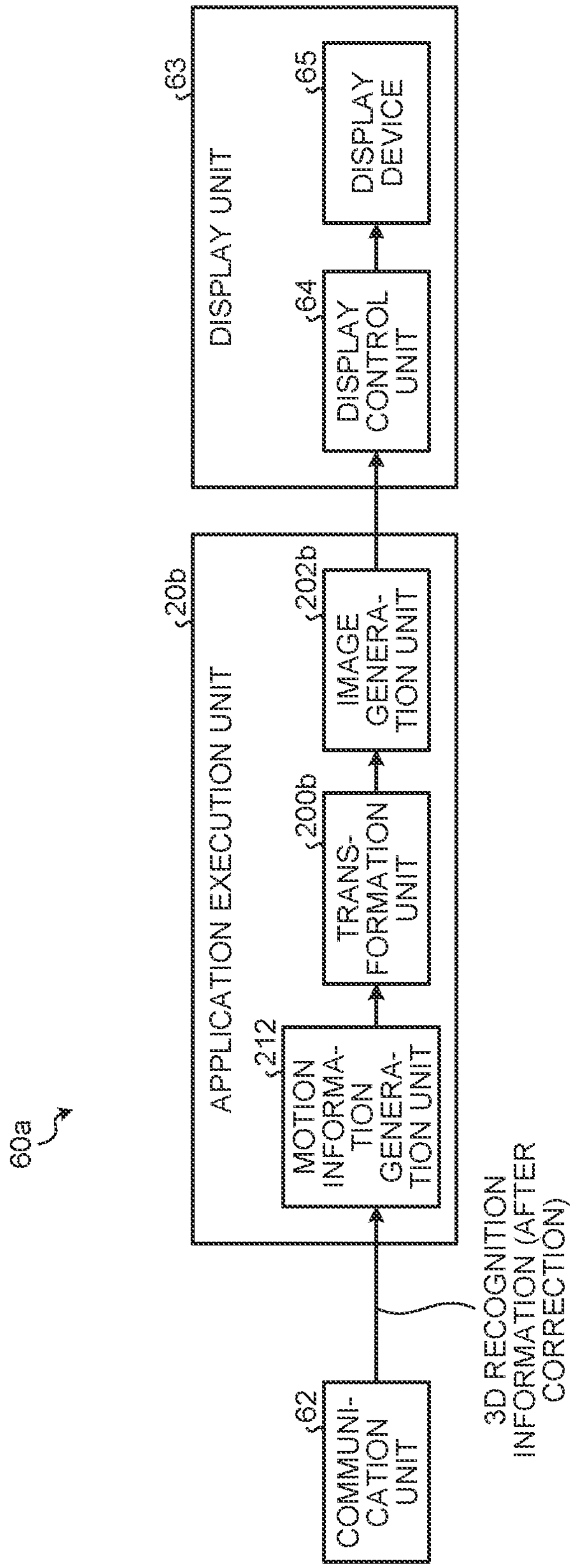
FIG. 14 is an exemplary functional block diagram illustrated to describe the functions of an eyeglass-type device according to the second embodiment.

FIG. 14 is an exemplary functional block diagram illustrated to describe the functions of the eyeglass-type device 60*a* according to the second embodiment. In FIG. 14, the application execution unit 20*b* includes a motion information generation unit 212, a transformation unit 200*b*, and an image generation unit 202*b*.

The motion information generation unit 212, the transformation unit 200*b*, and the image generation unit 202*b* are configured by executing a program on the CPU. The present invention is not limited thereto, and the motion information generation unit 212, the transformation unit 200*b*, and the image generation unit 202*b* may be configured by hardware circuits that operate in cooperation with each other.

The motion information generation unit 212 generates motion information indicating a motion (throw, receive, hold, etc.) with respect to the operated object by the player 325 on the basis of the 3D recognition information passed from the communication unit 62. The motion information includes, for example, information indicating the position and posture of the operated object. The present invention is not limited thereto, and the motion information may further include velocity information indicating the velocity of the operated object.

The transformation unit 200*b* transforms the coordinates of the image of the operated object into coordinates on the display unit 63 of the eyeglass-type device 60*a* on the basis of the motion information generated by the motion information generation unit 212. The image generation unit 202*b* generates an image of the operated object in accordance with the coordinates transformed by the transformation unit 200*b*, and passes the generated image to the display unit 63.

The display unit 63 includes a display control unit 64 and a display device 65. The display control unit 64 generates a display signal for the display device 65 to display the image of the operated object passed from the application execution unit 20*b*.

The display device 65 includes, for example, a display element based on a liquid crystal display (LCD), an organic light-emitting diode (OLED) and the like, a drive circuit that drives the display element, and an optical system that projects an image displayed by the display element onto the eyeglass surface of the eyeglass-type device 60*a*. The display device 65 displays the image of the operated object by the display element according to the display signal generated by the display control unit 64, and projects the displayed image on the eyeglass surface.

Figure 15:
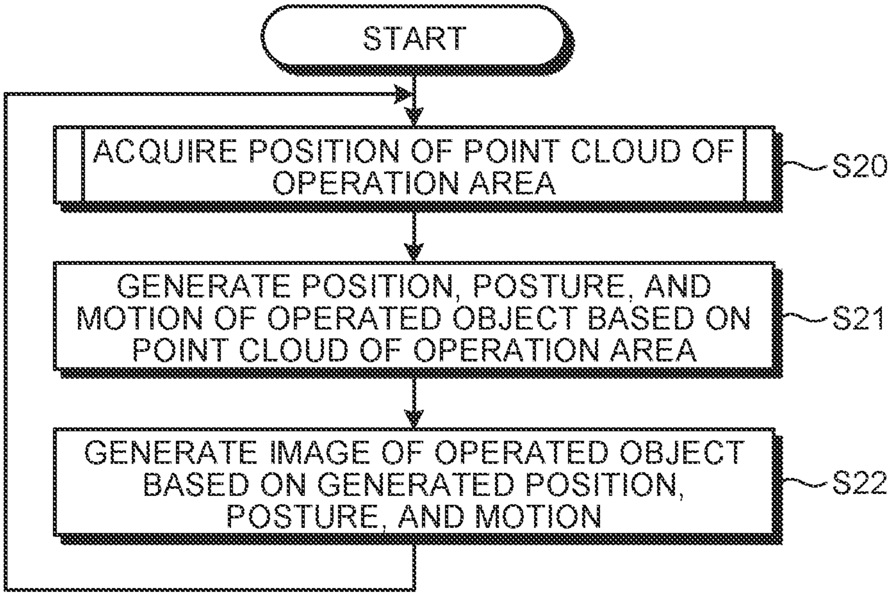
FIG. 15 is a flowchart of an example for explaining an operation by a sensing system according to the second embodiment.

FIG. 15 is a flowchart of an example for explaining an operation by a sensing system 1*b* according to the second embodiment.

In FIG. 15, in step S20, the sensing system 1*b* acquires the position of the point cloud of the operation area (for example, the hand 326 of the player 325) by the sensor unit 10. In the next step S21, the sensing system 1*b* generates the position, posture, and motion of an operation object (for example, the virtual ball 340) by using the motion information generation unit 212 on the basis of the point cloud of the operation area acquired in step S20. In the next step S22, the sensing system 1*b* generates an image of the operation object by using the image generation unit 202*b* on the basis of the position, posture, and motion of the operation object generated in step S21. The image generation unit 202*b* passes the generated image of the operation object to the display unit 63. After the processing of step S22, the processing returns to step S20.

Figure 16:
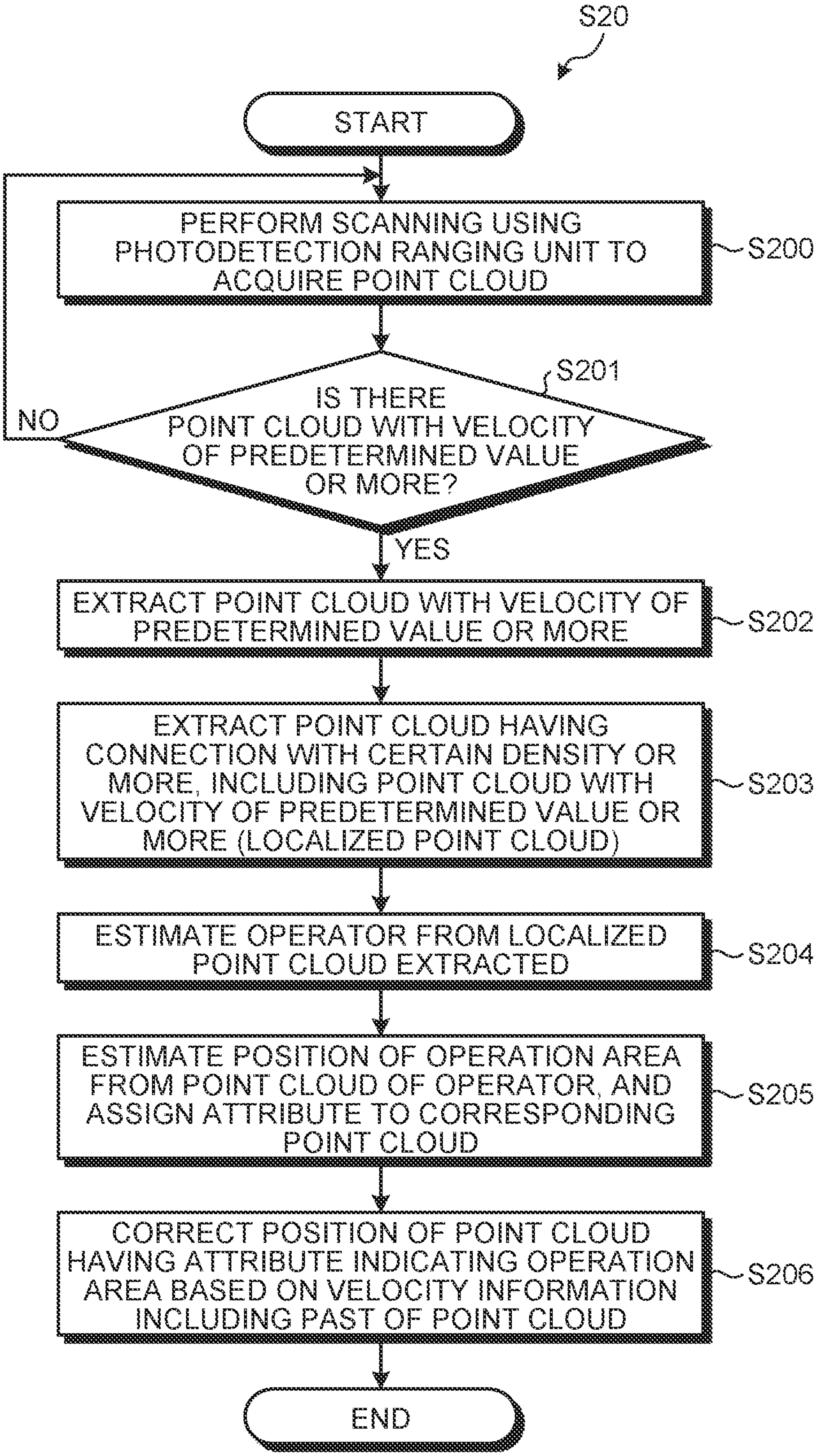
FIG. 16 is a flowchart of an example for explaining processing by a sensor unit according to the second embodiment.

FIG. 16 is a flowchart of an example for explaining processing by a sensor unit 10 according to the second embodiment. The flowchart of FIG. 16 illustrates the processing of step S20 of FIG. 15 described above in more detail.

In FIG. 16, in step S200, the sensor unit 10 performs scanning using the photodetection ranging unit 11 to acquire a point cloud. It is assumed that the acquired point cloud includes a point cloud corresponding to a real object as an operator (a player 325 in the example of FIG. 12) who operates the operation object.

In the next step S201, the sensor unit 10 causes the 3D object detection unit 121 to determine whether or not there is a point cloud with the velocity of a predetermined value or more in the point clouds acquired in step S200. In a case where the 3D object detection unit 121 determines that there is no point cloud with the velocity of a predetermined value or more (step S201, "No"), the sensor unit 10 returns the processing to step S200. On the other hand, in a case where the 3D object detection unit 121 determines that there is a point cloud with the velocity of a predetermined value or more, the sensor unit 10 proceeds the processing to step S202.

In step S202, the sensor unit 10 causes the 3D object detection unit 121 to extract a point cloud with the velocity of a predetermined value or more out of the point clouds acquired in step S200. In the next step S203, the sensor unit 10 causes the 3D object detection unit 121 to extract, from the point clouds acquired in step S200, a point cloud including the point clouds extracted in step S202, having a connection with a certain density or more, for example, as a localized point cloud.

In the next step S204, the sensor unit 10 estimates an operator (a player 325 in an example of FIG. 12) using the 3D object recognition unit 122 on the basis of the localized point cloud extracted in step S203. In the next step S205, the sensor unit 10 estimates the position of the operation area from the point cloud of the operator estimated in step S204 using the 3D object recognition unit 122, and assigns an attribute indicating the operation area to the point cloud corresponding to the estimated operation area.

In the next step S206, the sensor unit 10 corrects the position of the point cloud having the attribute indicating the operation area using the velocity information indicated by the point cloud acquired in step S200, and the position of the point cloud corresponding to the operation area specified in step S205. For example, the point cloud correction unit 125 can correct the current position of the operation area using the past position and velocity information related to the operation area stored in the storage unit 126.

The point cloud correction unit 125 passes the point cloud of the operation area whose position has been corrected to the application execution unit 20*b*. In addition, the point cloud correction unit 125 stores the corrected position and the velocity information of the point cloud in the storage unit 126.

After the processing of step S206, the processing proceeds to the processing of step S21 of FIG. 15.

As described above, in the second embodiment, the sensor unit 10 extracts the localized point cloud corresponding to the operator from the point cloud acquired by the scanning of the photodetection ranging unit 11, and further extracts the point cloud of the operation area from the localized point cloud. The sensor unit 10 corrects the position of the operation area by the extracted point cloud using the velocity information of the point cloud acquired by the scanning of the photodetection ranging unit 11. Therefore, by applying the second embodiment, the number of point clouds to be processed can be reduced, responsiveness can be improved, and deviation and delay of the operation area with respect to the position of the operation object can be suppressed. Therefore, by applying the second embodiment, it is possible to improve display responsiveness according to a wide range of movement of a person or an object other than a person. As a result, the operator who is the player 325 can comfortably operate the operation object.

3-1. Modification of Second Embodiment

A modification of the second embodiment is now described. In the second embodiment described above, the sensor unit 10 is provided outside the eyeglass-type device. On the other hand, a modification of the second embodiment is an example in which the sensor unit 10 is incorporated in an eyeglass-type device.

Figure 17:
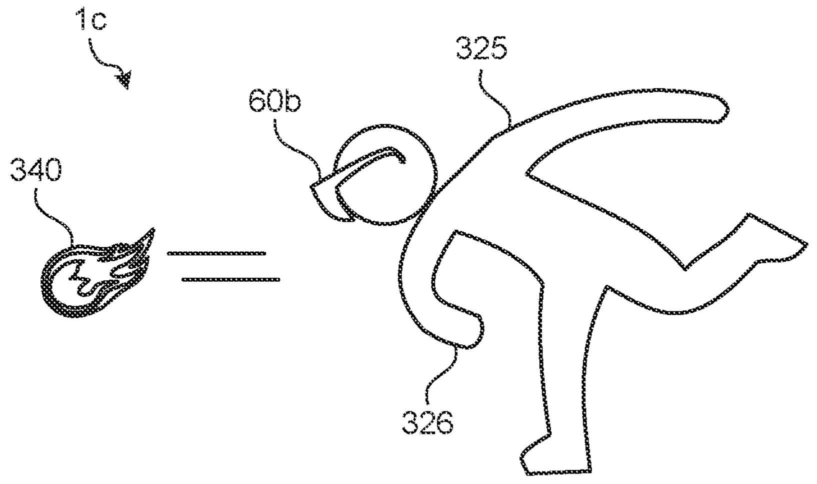
FIG. 17 is a block diagram illustrating an exemplary configuration of a sensing system according to a modification of the second embodiment.

FIG. 17 is a block diagram illustrating an exemplary configuration of a sensing system according to the modification of the second embodiment. In FIG. 17, a sensing system 1*c* includes an eyeglass-type device 60*b* that is MR compatible.

Figure 18:
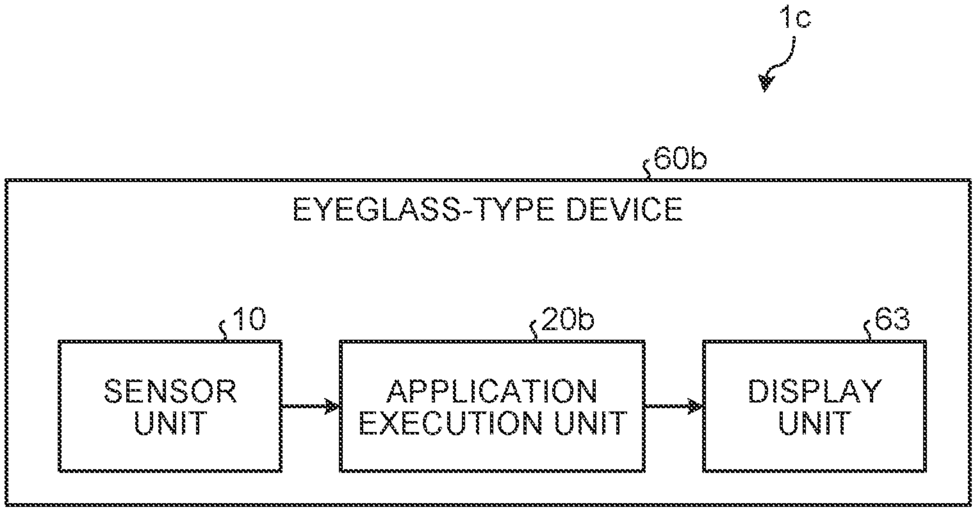
FIG. 18 is a block diagram illustrating an exemplary configuration of the sensing system according to the modification of the second embodiment.

FIG. 18 is a block diagram illustrating an exemplary configuration of the sensing system 1*c* according to the modification of the second embodiment. In FIG. 18, the eyeglass-type device 60*b* includes a sensor unit 10, an application execution unit 20*b*, and a display unit 63. For example, the sensor unit 10 is incorporated in the eyeglass-type device 60*b* so as to be able to scan the operation area (for example, the hand 326) of the player 325.

As illustrated in FIG. 17, the player 325 can observe the virtual ball 340 by wearing the eyeglass-type device 60*b*. The space including the hand 326 as the operation area of the player 325 is scanned by the photodetection ranging unit 11 in the sensor unit 10 incorporated in the eyeglass-type device 60*b*. The sensor unit 10 extracts a localized point cloud corresponding to the hand 326 on the basis of the point cloud acquired by the scanning, and assigns an attribute to the extracted localized point cloud. The sensor unit 10 corrects the position of the localized point cloud to which the attribute is assigned on the basis of the velocity information including the past of the localized point cloud, and outputs the 3D recognition information in which the position of the localized point cloud is corrected.

The application execution unit 20*b* generates an image of the operation object (the virtual ball 340 in the example of FIG. 17) on the basis of the 3D recognition information output from the sensor unit 10. The image of the operation object generated by the application execution unit 20*b* is passed to the display unit 63 and projected and displayed on the display device 65.

As described above, according to the modification of the second embodiment, the player 325 can perform e-sports by using only the eyeglass-type device 60*b*, and the system configuration can be reduced.

4. Third Embodiment

The description is now given of a third embodiment. The third embodiment is an example in which the sensing system according to the present disclosure is applied to projection mapping. Projection mapping is a technique of projecting an image on a three-dimensional object using a projection device such as a projector. In the projection mapping according to the third embodiment, an image is projected on a moving three-dimensional object.

Hereinafter, the "moving three-dimensional object" is appropriately referred to as a "moving body".

Figure 19:
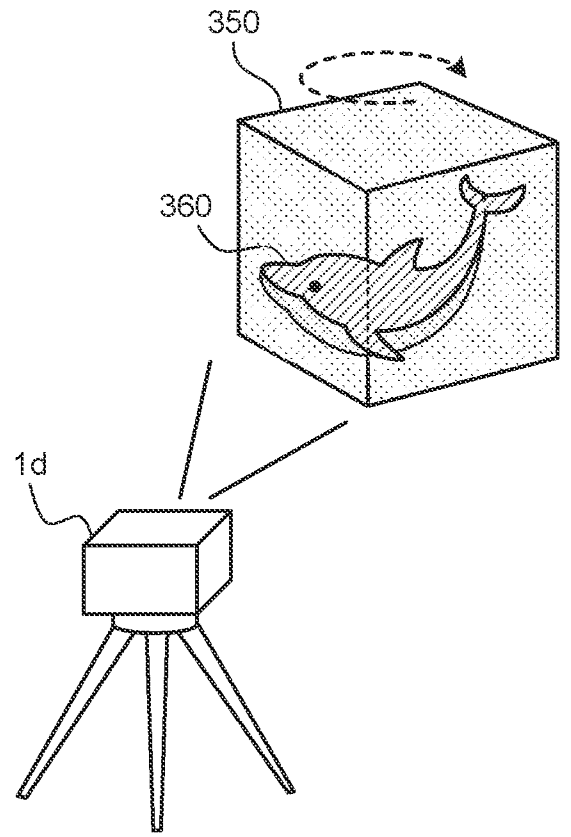
FIG. 19 is a schematic diagram for explaining exemplary usage of a sensing system according to a third embodiment.

FIG. 19 is a schematic diagram for explaining exemplary usage of a sensing system according to the third embodiment. In FIG. 19, for example, as indicated by an arrow in the figure, a sensing system 1*d* scans a space including a moving body 350 that rotates as a real object, and specifies the moving body 350. In addition, the sensing system 1*d* may determine a surface of the moving body 350 facing the measurement direction of the photodetection ranging unit 11 as a designated area. The sensing system 1*d* includes a projector, and projects a projection image 360 on the specified moving body 350.

Figure 20:
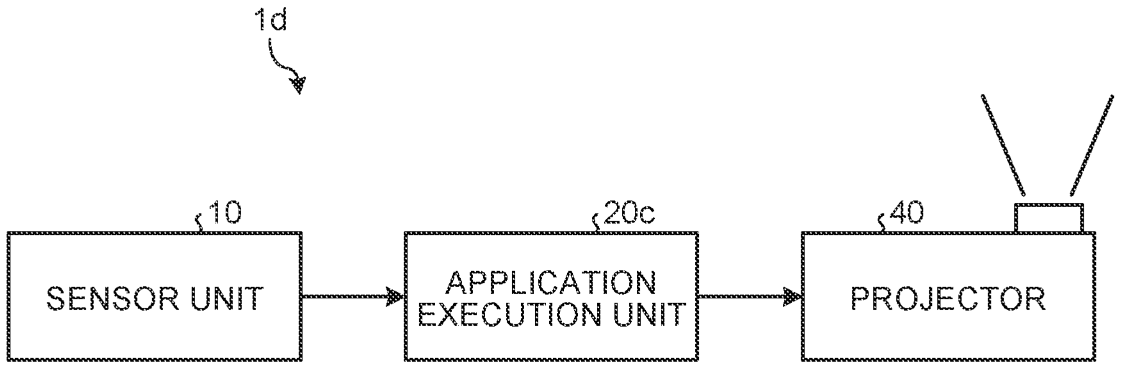
FIG. 20 is a block diagram illustrating an exemplary configuration of the sensing system according to the third embodiment.

FIG. 20 is a block diagram illustrating an exemplary configuration of the sensing system 1*d* according to the third embodiment. In FIG. 20, the sensing system 1*d* includes a sensor unit 10, an application execution unit 20*c*, and a projector 40. The application execution unit 20*c* deforms an image on the basis of the 3D recognition result obtained by scanning the space including the moving body 350 by the sensor unit 10, and generates the projection image 360 to be projected by the projector 40. The projection image 360 generated by the application execution unit 20*c* is projected on the moving body 350 by the projector 40.

Figure 21:
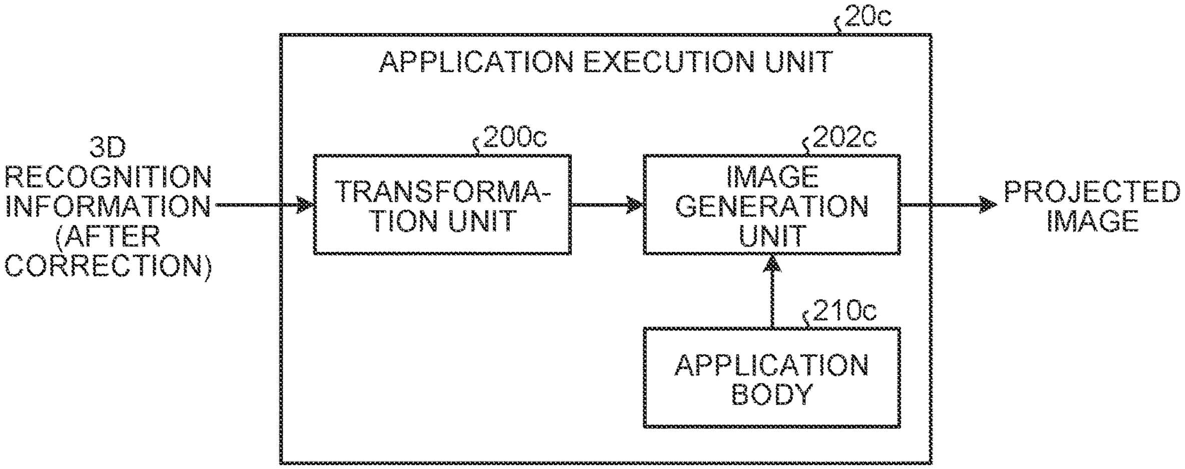
FIG. 21 is an exemplary functional block diagram illustrated to describe the functions of an application execution unit according to the third embodiment.

FIG. 21 is an exemplary functional block diagram illustrated to describe the functions of the application execution unit 20*c* according to the third embodiment. In FIG. 21, the application execution unit 20*c* includes a transformation unit 200*c*, an image generation unit 202*c*, and an application body 210*c*.

The transformation unit 200*c*, the image generation unit 202*c*, and the application body 210*c* are configured by executing a predetermined program on a CPU. The present invention is not limited thereto, and the transformation unit 200*c*, the image generation unit 202*c*, and the application body 210*c* may be configured by hardware circuits that operate in cooperation with each other.

The transformation unit 200*c* performs coordinate transformation according to the projection surface of the moving body 350 on the basis of the position and posture of the moving body 350 indicated in the corrected 3D recognition information supplied from the sensor unit 10. The transformation unit 200*c* passes the coordinate information subjected to the coordinate transformation to the image generation unit 202*c*.

The application body 210*c* has in advance a projection image (or video) to be projected on the moving body 350. The application body 210*c* passes the projection image to the image generation unit 202*c*. The image generation unit 202*c* deforms the projection image passed from the application body 210*c* on the basis of the coordinate information passed from the transformation unit 200*c*, and passes the deformed projection image to the projector 40.

Figure 22:
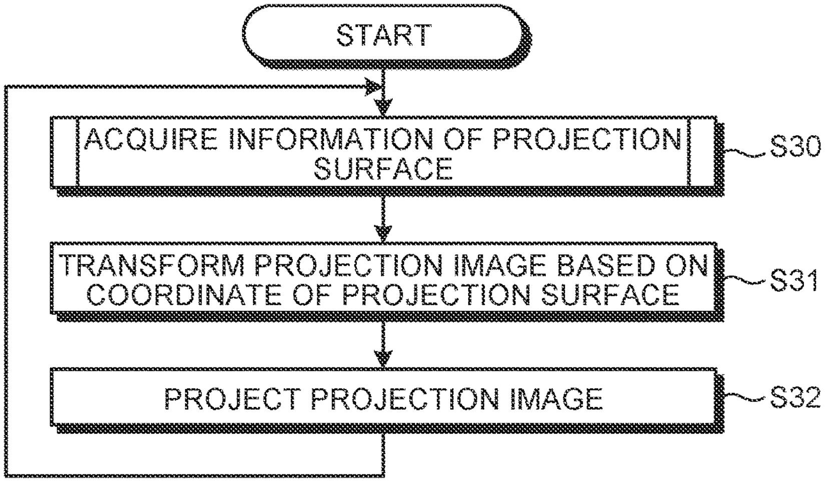
FIG. 22 is a flowchart of an example for explaining an operation by a sensing system according to the third embodiment.

FIG. 22 is a flowchart of an example for explaining an operation by the sensing system 1*d* according to the third embodiment. Note that the application body 210*c* is assumed to have a projection image in advance. The projection image may be a still image or a moving image.

In step S30, the sensing system 1*d* acquires information of the projection surface on which the image (video) from the projector 40 is projected in the moving body 350 on the basis of the point cloud acquired by the scanning of the space including the moving body 350 by the sensor unit 10. The information on the projection surface includes coordinate information indicating 3D coordinates of the projection surface in the real space. In the next step S31, the sensing system 1*d* causes the application execution unit 20*c* to transform, for example, the shape of the projection image into a shape corresponding to the projection surface on the basis of the coordinate information of the projection surface acquired in step S30. In the next step S32, the sensing system 1*d* projects the projection image subjected to the shape transformation in step S31 using the projector 40 on the projection surface of the moving body 350.

Figure 23:
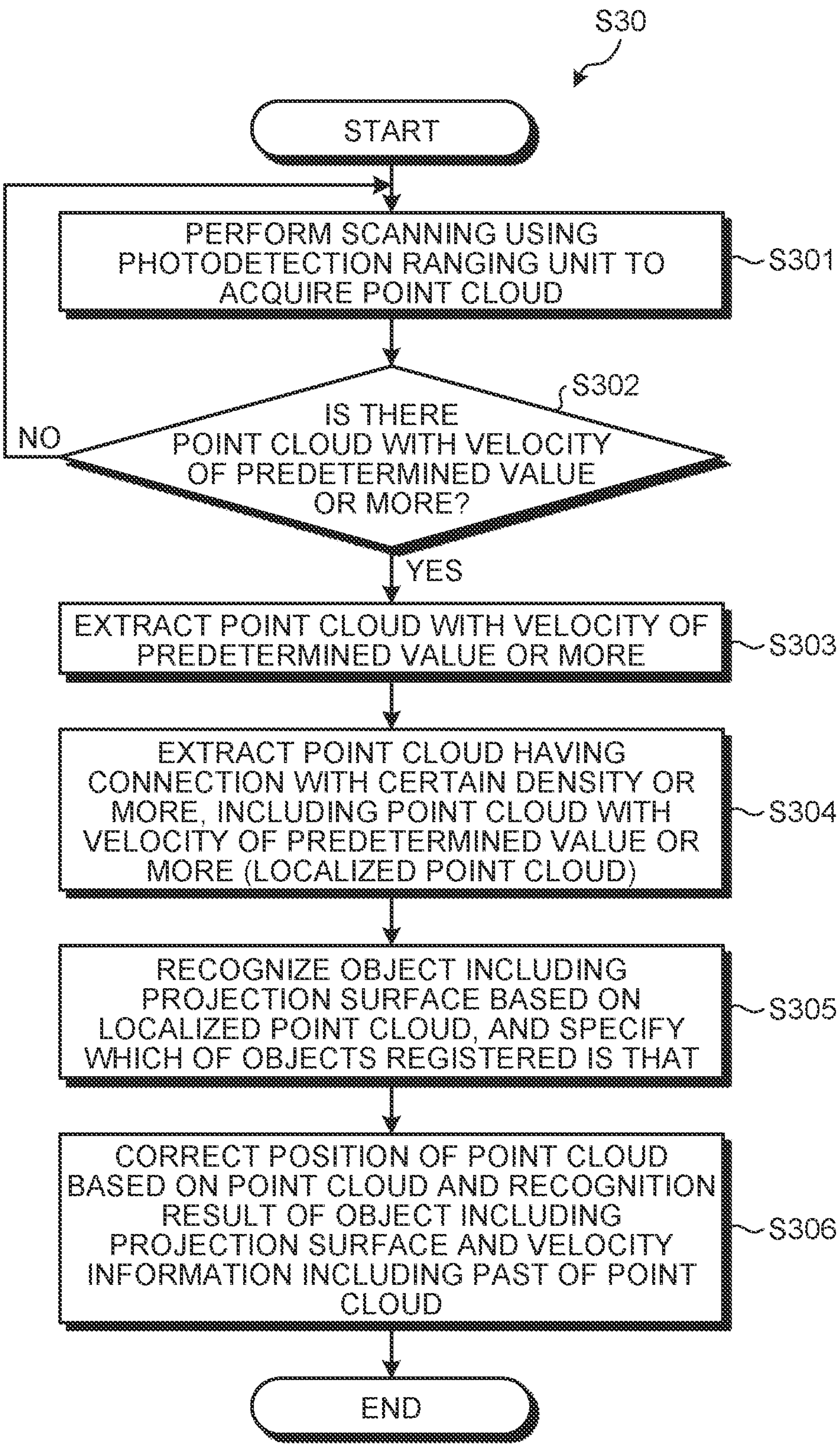
FIG. 23 is a flowchart of an example for explaining processing by a sensor unit according to the third embodiment.

FIG. 23 is a flowchart of an example for explaining processing by the sensor unit 10 according to the third embodiment. The flowchart of FIG. 23 illustrates the processing of step S30 in the flowchart of FIG. 22 described above in more detail.

Note that, prior to the processing according to the flowchart of FIG. 23, it is assumed that the 3D object recognition unit 122 registers the information of the moving body 350 in advance. The 3D object recognition unit 122 can register in advance information such as a shape, a size, a weight, a motion pattern, and a motion speed as the information of the moving body 350.

In step S301, the sensor unit 10 performs scanning a space including the moving body 350 using the photodetection ranging unit 11 to acquire a point cloud.

In the next step S302, the sensor unit 10 causes the 3D object detection unit 121 to determine whether or not there is a point cloud with the velocity of a predetermined value or more in the point clouds acquired in step S301. In a case where the 3D object detection unit 121 determines that there is no point cloud with the velocity of a predetermined value or more (step S302, "No"), the sensor unit 10 returns the processing to step S301. On the other hand, in a case where the 3D object detection unit 121 determines that there is a point cloud with the velocity of a predetermined value or more (step S302, "Yes"), the sensor unit 10 proceeds the processing to step S303.

In step S303, the sensor unit 10 causes the 3D object detection unit 121 to extract a point cloud with the velocity of a predetermined value or more out of the point clouds acquired in step S301. In the next step S304, the sensor unit 10 causes the 3D object detection unit 121 to extract, from the point clouds acquired in step S301, a point cloud including the point clouds extracted in step S303, having a connection with a certain density or more, for example, as a localized point cloud.

In the next step S305, the sensor unit 10 causes the 3D object recognition unit 122 to recognize the object including the projection surface on the basis of the localized point cloud. The 3D object recognition unit 122 specifies which of the objects registered in advance is the recognized object.

In the next step S306, the sensor unit 10 corrects the position of the point cloud using the point cloud correction unit 125 on the basis of the point cloud and the recognition result of the object including the projection surface (the moving body 350 in the example of FIG. 19) and the velocity information including the past of the point cloud. For example, the point cloud correction unit 125 can correct the current position and orientation of the projection surface using the past position and orientation related to the projection surface and the velocity information stored in the storage unit 126. Furthermore, in a case where the information regarding the target moving body 350 is registered in advance in the 3D object recognition unit 122, the point cloud correction unit 125 can further use the information regarding the moving body 350 when correcting the position and posture of the projection surface.

The point cloud correction unit 125 passes the localized point cloud of the designated area whose position and posture have been corrected to the application execution unit 20*c*. In addition, the point cloud correction unit 125 stores the corrected information indicating the position and posture of a point cloud of the projection surface and the velocity information of the point cloud in the storage unit 126.

After the processing of step S306, the processing proceeds to the processing of step S31 of FIG. 22.

As described above, in the third embodiment, the position and posture of the projection surface projected by the projector 40 in the moving body 350 are corrected by the point cloud correction unit 125 using the past position and posture of the projection surface and the velocity information. Therefore, by applying the third embodiment to projection mapping, it is possible to reduce the deviation of the projection position when an image or a video is projected on the moving body 350 during exercise, and to perform presentation with less discomfort. Therefore, by applying the third embodiment, it is possible to improve display responsiveness according to a wide range of movement of a person or an object other than a person.

5. Fourth Embodiment

The description is now given of a fourth embodiment. The fourth embodiment is an example in which an imaging device is provided in the sensor unit in addition to a photodetection ranging unit 11, and object recognition is performed using a point cloud acquired by the photodetection ranging unit 11 and a captured image captured by an imaging device to obtain 3D recognition information.

An imaging device capable of acquiring a captured image having information of colors of red (R), green (G), and blue (B) generally has a much higher resolution than the photodetection ranging unit 11 based on FMCW-LiDAR. Therefore, by performing the recognition processing using the photodetection ranging unit 11 and the imaging device, the detection and recognition processing can be executed with higher accuracy as compared with a case where the detection and recognition processing is performed using only the point cloud information from the photodetection ranging unit 11.

Figure 24:
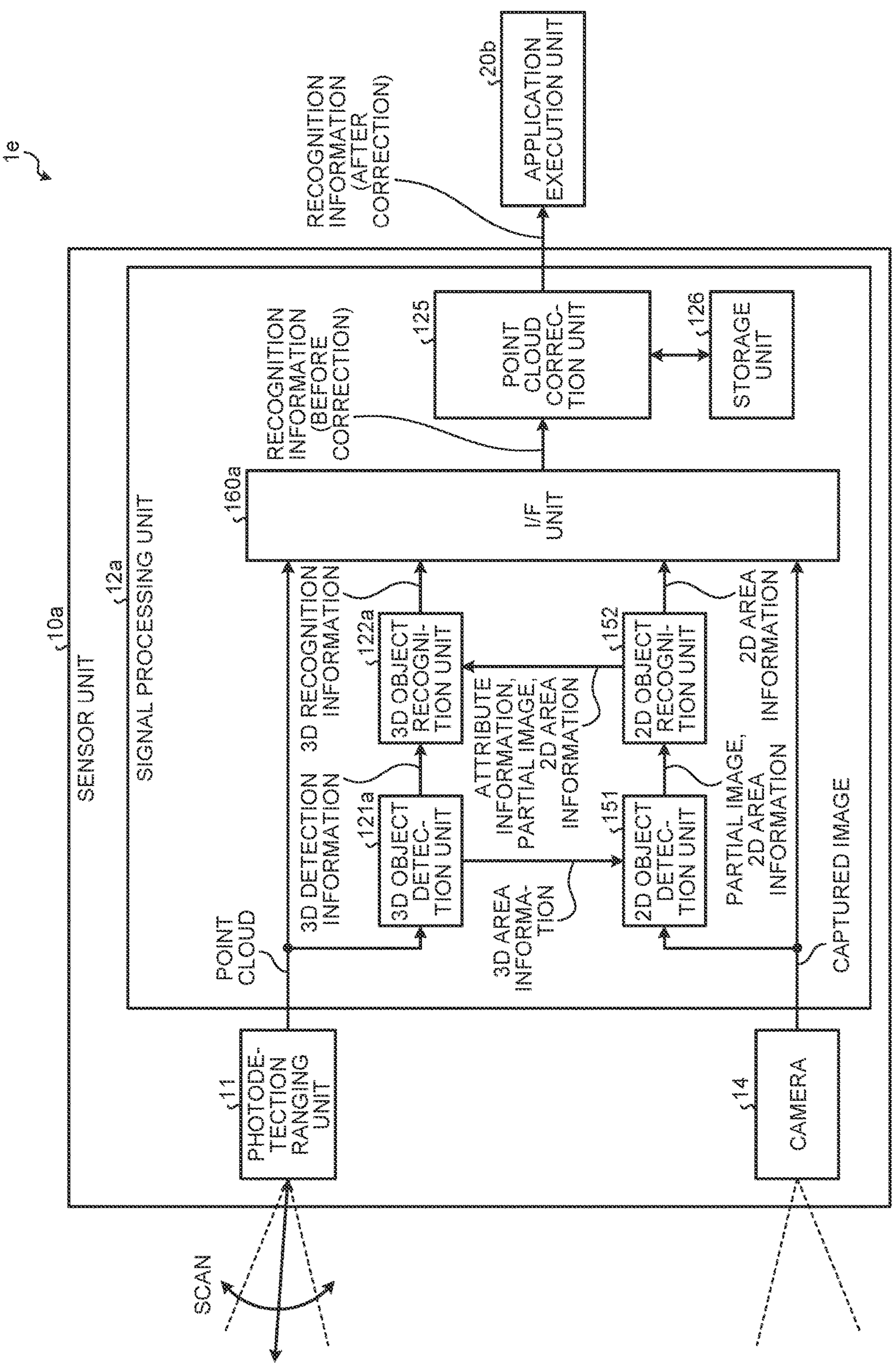
FIG. 24 is a block diagram illustrating an exemplary configuration of a sensing system according to a fourth embodiment.

FIG. 24 is a block diagram illustrating an exemplary configuration of a sensing system according to the fourth embodiment. Note that, here, it is assumed that the sensing system according to the fourth embodiment is applied to e-sports described using the second embodiment. In FIG. 24, a sensing system 1*e* includes a sensor unit 10*a* and an application execution unit 20*b*.

The sensor unit 10*a* includes a photodetection ranging unit 11, a camera 14, and a signal processing unit 12*a*. The camera 14 is an imaging device capable of acquiring a captured image having information of colors of RGB, and is capable of acquiring a captured image having a resolution higher than the resolution of the point cloud acquired by the photodetection ranging unit 11. The photodetection ranging unit 11 and the camera 14 are arranged to acquire information in the same direction. In addition, it is assumed that the photodetection ranging unit 11 and the camera 14 match the relationship in posture, position, and size for each visual field, and the correspondence relationship between each point included in the point cloud acquired by the photodetection ranging unit 11 and each pixel of the captured image acquired by the camera 14 is acquired in advance.

Hereinafter, it is assumed that the photodetection ranging unit 11 and the camera 14 are installed so as to be able to scan and image a space including a 3D object (for example, a person) to be measured.

The signal processing unit 12*a* includes a 3D object detection unit 121*a*, a 3D object recognition unit 122*a*, a 2D object detection unit 151, a 2D object recognition unit 152, an I/F unit 160*a*, a point cloud correction unit 125, and a storage unit 126.

The point cloud having the velocity information output from the photodetection ranging unit 11 is supplied to the I/F unit 160*a* and the 3D object detection unit 121*a*.

Similarly to the 3D object detection unit 121 in FIG. 4, the 3D object detection unit 121*a* detects, from the point clouds, a point cloud having a velocity and a point cloud including the point cloud and having, for example, connection with a certain density or more as a localized point cloud corresponding to the 3D object. The 3D object detection unit 121*a* acquires 3D coordinates and velocity information of each point in the detected localized point clouds. Furthermore, the 3D object detection unit 121*a* adds label information indicating the 3D object corresponding to the localized point clouds to the area of the detected localized point clouds. The 3D object detection unit 121*a* outputs the 3D coordinates, the velocity information, and the label information regarding the localized point clouds as 3D detection information indicating a 3D detection result.

The 3D object detection unit 121*a* further outputs information indicating an area including the localized point clouds to the 2D object detection unit 151 as 3D information.

The captured image output from the camera 14 is supplied to the I/F unit 160*a* and the 2D object detection unit 151.

The 2D object detection unit 151 transforms the 3D area information supplied from the 3D object detection unit 121*a* into 2D area information that is two-dimensional information corresponding to the captured image. The 2D object detection unit 151 cuts out an image of an area indicated by the 2D area information as a partial image from the captured image supplied from the camera 14. The 2D object detection unit 151 supplies the 2D area information and the partial image to the 2D object recognition unit 152.

The 2D object recognition unit 152 executes recognition processing on the partial image supplied from the 2D object detection unit 151, and adds attribute information as a recognition result to each pixel of the partial image. As described above, the 2D object recognition unit 152 supplies the partial image including the attribute information and the 2D area information to the 3D object recognition unit 122*a*. Furthermore, the 2D object recognition unit 152 supplies the 2D area information to the I/F unit 160*a*.

Similarly to the 3D object recognition unit 122 in FIG. 4, the 3D object recognition unit 122*a* performs object recognition on the localized point cloud indicated by the 3D detection information on the basis of the 3D detection information output from the 3D object detection unit 121*a* and the partial image including the attribute information and the 2D area information supplied from the 2D object recognition unit 152. The 3D object recognition unit 122*a* estimates the attribute information on the recognized object by the point cloud recognition processing. The 3D object recognition unit 122*a* further adds the estimated attribute information to each pixel of the partial image.

When the certainty factor of the estimated attribute information is equal to or greater than a certain value, the 3D object recognition unit 122*a* outputs the recognition result for the localized point cloud as the 3D recognition information. The 3D object recognition unit 122*a* can include 3D coordinates regarding the localized point cloud, velocity information, attribute information, the position, size, and posture of the recognized object, and the certainty factor in the 3D recognition information. The 3D recognition information is input to the I/F unit 160*a*.

The I/F unit 160*a* outputs designated information out of the point cloud supplied from the photodetection ranging unit 11, the captured image supplied from the camera 14, the 3D recognition information supplied from the 3D object recognition unit 122*a*, and the 2D area information supplied from the 2D object recognition unit 152. In the example of FIG. 24, the I/F unit 160*a* outputs the 3D recognition information as the 3D recognition information before correction.

Since the processing in the point cloud correction unit 125 is similar to the processing described with reference to FIG. 4, the description thereof will be omitted here.

Figure 25:
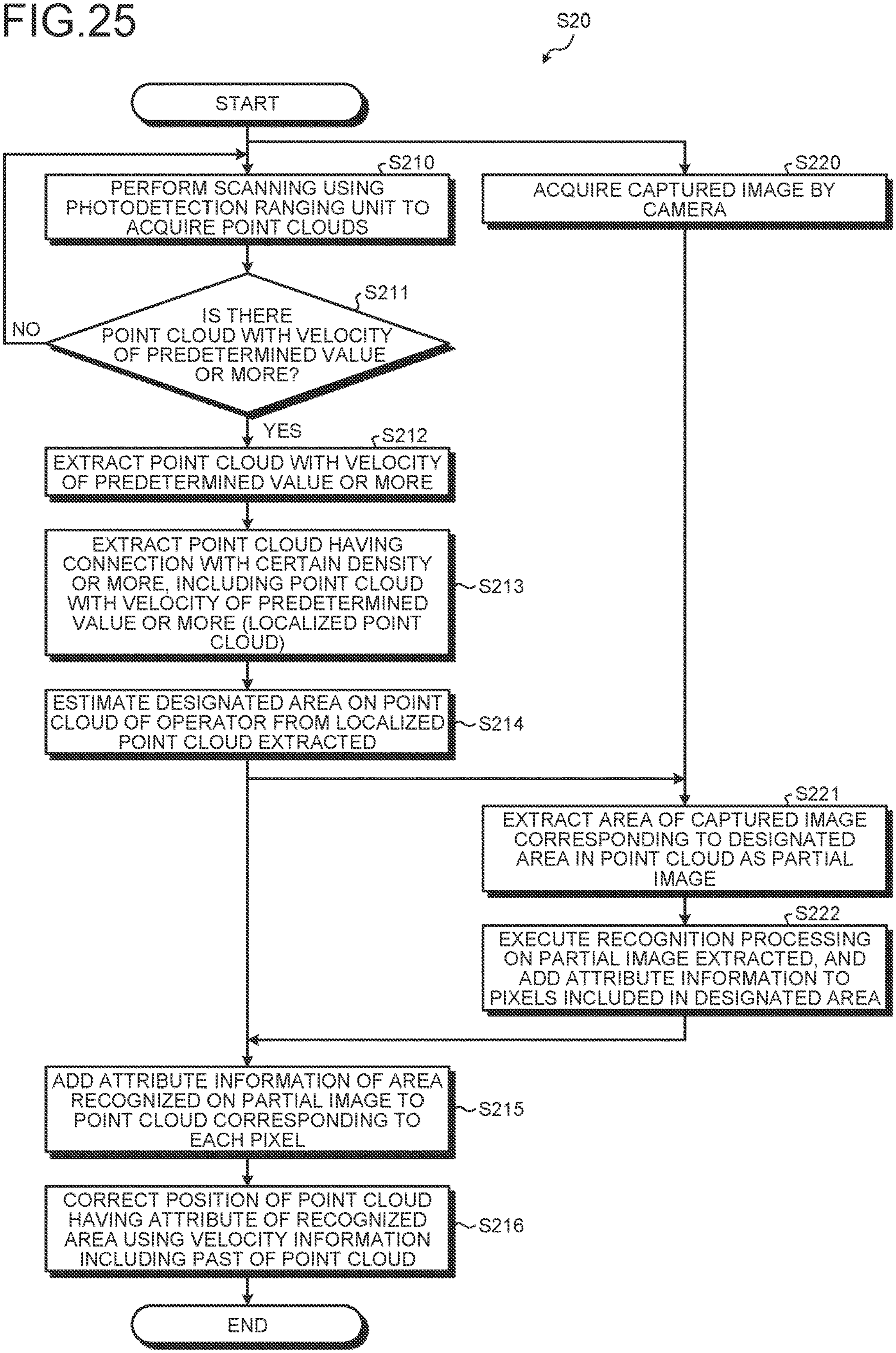
FIG. 25 is a flowchart of an example for explaining processing by a sensor unit according to the fourth embodiment.

FIG. 25 is a flowchart of an example for explaining processing by the sensor unit 10*a* according to the fourth embodiment.

Note that, here, it is assumed that the sensing system 1*e* according to the fourth embodiment is applied to e-sports described using the second embodiment, and the flowchart of FIG. 25 illustrates the processing of step S20 of the flowchart of FIG. 15 in more detail. Note that this is not limited to this example. The sensing system 1*e* is also applicable to the first embodiment and modifications thereof, and the third embodiment.

In step S210, the sensor unit 10*a* performs scanning using the photodetection ranging unit 11 to acquire point clouds. It is assumed that the acquired point clouds include a point cloud corresponding to a real object as an operator who operates the operation image.

In parallel with the processing in step S210, in step S220, the sensor unit 10*a* performs imaging by the camera 14 to acquire a captured image. The captured image is supplied to the I/F unit 160*a* and the 2D object detection unit 151. After the processing of step S210, the processing proceeds to step S221 after waiting for the processing of step S214 to be described later.

When the point cloud is acquired in step S211, in step S211, the sensor unit 10*a* causes the 3D object detection unit 121*a* to determine whether or not there is a point cloud with the velocity of a predetermined value or more in the point clouds acquired in step S210. In a case where the 3D object detection unit 121*a* determines that there is no point cloud with the velocity of a predetermined value or more (step S211, "No"), the sensor unit 10*a* returns the processing to step S210. On the other hand, in a case where the 3D object detection unit 121*a* determines that there is a point cloud with the velocity of a predetermined value or more (step S211, "Yes"), the sensor unit 10*a* proceeds the processing to step S212.

In step S212, the sensor unit 10*a* causes the 3D object detection unit 121*a* to extract a point cloud with the velocity of a predetermined value or more out of the point clouds acquired in step S210. In the next step S213, the sensor unit 10*a* causes the 3D object detection unit 121*a* to extract, from the point clouds acquired in step S210, a point cloud including the point clouds extracted in step S212, having a connection with a certain density or more, for example, as a localized point cloud.

In the next step S214, the sensor unit 10*a* estimates the designated area using the 3D object detection unit 121*a* on the basis of the localized point cloud extracted in step S213. In this example in which the sensing system 1*e* is applied to e-sports, the designated area is an operation area in the player 325 for the player 325 to operate a virtual playing tool (such as a virtual ball 340). Which area is set as the designated area can be designated in advance with respect to the sensing system 1*e*.

The 3D object detection unit 121*a* passes the designated area estimated in step S214 to the 2D object detection unit 151 as 3D area information.

In step S221, the 2D object detection unit 151 extracts an area of the captured image corresponding to the operation area in the point cloud as a partial image on the basis of the 3D area information passed from the 3D object detection unit 121*a*. Furthermore, the 2D object detection unit 151 transforms the 3D area information into 2D area information. The 2D object detection unit 151 passes the extracted partial image and the 2D area information transformed from the 3D area information to the 2D object recognition unit 152.

In the next step S222, the 2D object recognition unit 152 executes recognition processing on the partial image extracted in step S221, and adds an attribute obtained as a result of the recognition processing to pixels included in an area designated in the partial image. The 2D object recognition unit 152 supplies the partial image including the attribute information and the 2D area information to the 3D object recognition unit 122*a*.

When the 3D object recognition unit 122*a* acquires the partial image including the attribute information supplied from the 2D object recognition unit 152 and the 2D area information, the processing proceeds to step S215. In step S215, the sensor unit 10*a* causes the 3D object recognition unit 122*a* to add the attribute information obtained according to the recognition processing on the partial image in the 2D object recognition unit 152 to the point cloud in the designated area estimated by the 3D object detection unit 121*a* in step S214.

The 3D object recognition unit 122*a* outputs 3D attribute information including the 3D coordinates of the point cloud in the designated region, the velocity information, the attribute information added to the point cloud by the recognition processing on the partial image, the position, size, and posture of the recognized object, and the certainty factor. The 3D recognition information output from the 3D object recognition unit 122*a* is supplied to the point cloud correction unit 125 via the I/F unit 160*a*.

In the next step S216, the sensor unit 10*a* causes the point cloud correction unit 125 to correct the position of the designated area estimated in step S214 using the velocity information included in the 3D recognition information. For example, the point cloud correction unit 125 can correct the current position of the designated area using the past position related to the designated area and the velocity information stored in the storage unit 126. The point cloud correction unit 125 may further correct the posture of the designated area.

The point cloud correction unit 125 passes the point cloud of the designated area whose position has been corrected to the application execution unit 20*b*. In addition, the point cloud correction unit 125 stores the corrected information indicating the position and posture of the localized point cloud and the velocity information of the localized point cloud in the storage unit 126.

As described above, in the fourth embodiment, in addition to the point cloud acquired by the photodetection ranging unit 11, the attribute information is added to the 3D object recognition result using the captured image captured by the camera 14 having a much higher resolution than the point cloud. Therefore, in the fourth embodiment, it is possible to improve display responsiveness according to a wide range of movement of a person or an object other than a person, and it is possible to add attribute information to a point cloud with higher accuracy as compared with a case where 3D object recognition is performed using only the point cloud acquired by the photodetection ranging unit 11.

Moreover, the effects described in the present specification are merely illustrative and are not restrictive, and other effects are achievable.

Note that the present technology may include the following configuration.

(1) An information processing apparatus comprising:
  a recognition unit configured to perform recognition processing on the basis of a point cloud output from a photodetection ranging unit using a frequency modulated continuous wave to determine a designated area in a real object, the photodetection ranging unit being configured to output the point cloud including velocity information and three-dimensional coordinates of the point cloud on the basis of a reception signal reflected by an object and received, and configured to output three-dimensional recognition information including information indicating the determined designated area; and a correction unit configured to correct three-dimensional coordinates of the designated area in the point cloud on the basis of the three-dimensional recognition information output by the recognition unit.

(2) The information processing apparatus according to the above (1), wherein the correction unit corrects the three-dimensional coordinates of the designated area using the three-dimensional coordinates based on the point cloud previously output by the photodetection ranging unit.

(3) The information processing apparatus according to the above (1) or (2), wherein the correction unit predicts and corrects the three-dimensional coordinates of the designated area on the basis of velocity information indicated by the point cloud.

(4) The information processing apparatus according to any one of the above (1) to (3), wherein the real object is a person, and the designated area is an arm or a foot of the person.

(5) The information processing apparatus according to the above (4), wherein the correction unit corrects three-dimensional coordinates of the designated area with respect to a direction indicated by the designated area and a plane intersecting the direction.

(6) The information processing apparatus according to any one of the above (1) to (3), wherein the real object is a moving body, and the designated area is a surface of the moving body in a measurement direction measured by the photodetection ranging unit.

(7) The information processing apparatus according to any one of the above (1) to (6), further comprising:

a generation unit configured to generate a display signal for displaying a virtual object on the basis of the three-dimensional coordinates of the designated area corrected by the correction unit.

(8) The information processing apparatus according to the above (7), wherein the generation unit generates the display signal for projecting an image of the virtual object onto a fixed surface.

(9) The information processing apparatus according to the above (8), wherein the generation unit transforms coordinates of the image of the virtual object into coordinates of the fixed surface on the basis of three-dimensional coordinates of the designated area and three-dimensional coordinates of the fixed surface.

(10) The information processing apparatus according to the above (7), wherein the generation unit generates the display signal for displaying an image of the virtual object on a display unit of an eyeglass-type device worn by a user.

(11) The information processing apparatus according to the above (7), wherein the generation unit generates the display signal for displaying an image of the virtual object on the real object which is a moving body.

(12) The information processing apparatus according to the above (11), wherein the correction unit determines a surface of the real object, which is the moving body, facing the photodetection ranging unit as the designated area, and the generation unit transforms coordinates of an image of the virtual object into three-dimensional coordinates of the designated area.

(13) An information processing method executed by a processor, comprising:

a recognition step for performing recognition processing on the basis of a point cloud output from a photodetection ranging unit using a frequency modulated continuous wave to determine a designated area in a real object, the photodetection ranging unit being configured to output the point cloud including velocity information and three-dimensional coordinates of the point cloud on the basis of a reception signal reflected by an object and received, and configured to output three-dimensional recognition information including information indicating the determined designated area; and a correction step for correcting three-dimensional coordinates of the designated area in the point cloud on the basis of the three-dimensional recognition information output in the recognition step.

(14) A sensing system comprising:

a photodetection ranging unit using a frequency modulated continuous wave configured to output a point cloud including velocity information and three-dimensional coordinates of the point cloud on the basis of a reception signal reflected by an object and received;

a recognition unit configured to perform recognition processing on the basis of the point cloud to determine a designated area in a real object, and configured to output three-dimensional recognition information including information indicating the determined designated area; and a correction unit configured to correct three-dimensional coordinates of the designated area in the point cloud on the basis of the three-dimensional recognition information output by the recognition unit.

REFERENCE SIGNS LIST

1, 1*a*, 1*b*, 1*c*, 1*d*, 1*e* SENSING SYSTEM
10, 10*a* SENSOR UNIT
11 PHOTODETECTION RANGING UNIT
12, 12*a* SIGNAL PROCESSING UNIT
14 CAMERA
20*a*, 20*b*, 20*c* APPLICATION EXECUTION UNIT
40 PROJECTOR
50 MOTION MEASUREMENT DEVICE
51, 62 COMMUNICATION UNIT
60*a*, 60*b* EYEGLASS-TYPE DEVICE
63 DISPLAY UNIT
100 SCANNING UNIT
101 OPTICAL TRANSMISSION UNIT
102 PBS
103 OPTICAL RECEPTION UNIT

111 SCANNING CONTROL UNIT
112 ANGLE DETECTION UNIT
116 TRANSMISSION LIGHT CONTROL UNIT
117 RECEPTION SIGNAL PROCESSING UNIT
130 POINT CLOUD GENERATION UNIT
121, 121*a* 3D OBJECT DETECTION UNIT
122, 122*a* 3D OBJECT RECOGNITION UNIT
125 POINT CLOUD CORRECTION UNIT
126 STORAGE UNIT
151 2D OBJECT DETECTION UNIT
152 2D OBJECT RECOGNITION UNIT
200*a*, 200*b*, 200*c* TRANSFORMATION UNIT
201*a* DETERMINATION UNIT
202*a*, 202*b*, 202*c* IMAGE GENERATION UNIT
210*a*, 210*c* APPLICATION BODY
212 MOTION INFORMATION GENERATION UNIT
300 WALL SURFACE
310*a*, 310*b* BUTTON IMAGE
311, 311*a*, 311*b* CURSOR IMAGE
312 KEYBOARD MUSICAL INSTRUMENT
320, 320*a*, 320*b* OPERATOR
321, 321*a*, 321*b*, 322, 326 HAND
325 PLAYER
330 VIRTUAL HAND
340 VIRTUAL BALL
350 MOVING BODY
360 PROJECTION IMAGE

The invention claimed is:

1. An information processing apparatus comprising:

a memory storing a program, and at least one processor configured to execute the program to perform operations comprising:

performing recognition processing based upon a point cloud output from a photodetection ranging unit using a frequency modulated continuous wave to determine a designated area in a real object, the point cloud including velocity information and three-dimensional coordinates of the point cloud based upon a reception signal reflected by an object and received;

outputting three-dimensional recognition information including information indicating the determined designated area;

correcting three-dimensional coordinates of the designated area in the point cloud based upon the three-dimensional recognition information; and generating a display signal for displaying a virtual object based upon the three-dimensional coordinates of the corrected designated area.

2. The information processing apparatus according to claim 1, wherein the operations further comprise:

correcting the three-dimensional coordinates of the designated area using the three-dimensional coordinates based on the point cloud previously output by the photodetection ranging unit.

3. The information processing apparatus according to claim 1, wherein the operations further comprise:

predicting and correcting the three-dimensional coordinates of the designated area on based upon velocity information indicated by the point cloud.

4. The information processing apparatus according to claim 1, wherein the real object is a person, and the designated area is an arm or a foot of the person.

5. An information processing apparatus comprising:

a memory storing a program, and at least one processor configured to execute the program to perform operations comprising:

performing recognition processing based upon a point cloud output from a photodetection ranging unit using a frequency modulated continuous wave to determine a designated area in a real object, the point cloud including velocity information and three-dimensional coordinates of the point cloud based upon a reception signal reflected by an object and received;

outputting three-dimensional recognition information including information indicating the determined designated area;

correcting three-dimensional coordinates of the designated area in the point cloud based upon the three-dimensional recognition information; and correcting three-dimensional coordinates of the designated area with respect to a direction indicated by the designated area and a plane intersecting the direction, wherein the real object is a person, and the designated area is an arm or a foot of the person.

6. The information processing apparatus according to claim 1, wherein the real object is a moving body, and the designated area is a surface of the moving body in a measurement direction measured by the photodetection ranging unit.

7. The information processing apparatus according to claim 1, wherein the operations further comprise:

generating the display signal for projecting an image of the virtual object onto a fixed surface.

8. The information processing apparatus according to claim 7, wherein the operations further comprise:

transforming coordinates of the image of the virtual object into coordinates of the fixed surface based upon three-dimensional coordinates of the designated area and three-dimensional coordinates of the fixed surface.

9. The information processing apparatus according to claim 1, wherein the operations further comprise:

generating the display signal for displaying an image of the virtual object on a display unit of an eyeglass-type device worn by a user.

10. The information processing apparatus according to claim 1, wherein the operations further comprise:

generating the display signal for displaying an image of the virtual object on the real object which is a moving body.

11. The information processing apparatus according to claim 10, wherein the operations further comprise:

determining a surface of the real object, which is the moving body, facing the photodetection ranging unit as the designated area; and transforming coordinates of an image of the virtual object into three-dimensional coordinates of the designated area.

12. A non-transitory computer readable medium storing a program, the program being executable by a processor to perform operations comprising:

performing recognition processing based upon a point cloud output from a photodetection ranging unit using a frequency modulated continuous wave to determine a designated area in a real object, the point cloud including velocity information and three-dimensional coordinates of the point cloud based upon a reception signal reflected by an object and received;

outputting three-dimensional recognition information including information indicating the determined designated area;

correcting three-dimensional coordinates of the designated area in the point cloud based upon the three-dimensional recognition information; and generating a display signal for displaying a virtual object based upon the three-dimensional coordinates of the corrected designated area.

13. The non-transitory computer readable medium according to claim 12, wherein the operations further comprise:

generating the display signal for projecting an image of the virtual object onto a fixed surface.

14. The non-transitory computer readable medium according to claim 13, wherein the operations further comprise:

transforming coordinates of the image of the virtual object into coordinates of the fixed surface on based upon three-dimensional coordinates of the designated area and three-dimensional coordinates of the fixed surface.

15. The non-transitory computer readable medium according to claim 12, wherein the operations further comprise:

generating the display signal for displaying an image of the virtual object on a display unit of an eyeglass-type device worn by a user.

16. The non-transitory computer readable medium according to claim 12, wherein the operations further comprise:

generating the display signal for displaying an image of the virtual object on the real object which is a moving body.

17. The non-transitory computer readable medium according to claim 16, wherein the operations further comprise:

determining a surface of the real object, which is the moving body, facing the photodetection ranging unit as the designated area; and transforming coordinates of an image of the virtual object into three-dimensional coordinates of the designated area.

* * * * *